United States Patent [19]

Kindig

[11] 4,051,594
[45] Oct. 4, 1977

[54] METHODS AND APPARATUS FOR USE IN MAKING ELECTRICAL INTERCONNECTIONS

[75] Inventor: Alan L. Kindig, Holland, Mich.

[73] Assignee: General Electric Company, Fort Wayne, Ind.

[21] Appl. No.: 698,922

[22] Filed: June 23, 1976

Related U.S. Application Data

[63] Continuation-in-part of Ser. No. 671,618, March 29, 1976, which is a continuation-in-part of Ser. No. 590,707, June 26, 1975, Pat. No. 3,962,780.

[51] Int. Cl.² .................... H02K 15/00; H01R 43/04
[52] U.S. Cl. ........................... 29/596; 29/566.2; 29/628; 29/736; 29/753; 72/DIG. 10; 140/139; 140/147; 226/115; 226/143
[58] Field of Search .......... 29/205 D, 205 R, 203 D, 29/203 DT, 203 DS, 596, 628, 736, 753, 566.2; 72/DIG. 10, 183; 140/139, 140, 147; 226/115, 143

[56] References Cited

U.S. PATENT DOCUMENTS

| | | | |
|---|---|---|---|
| 2,389,644 | 11/1945 | Shibovich | 140/147 |
| 2,797,724 | 7/1957 | Walldow | 72/441 |
| 3,051,213 | 8/1962 | Batcheller | 72/441 |
| 3,190,319 | 6/1965 | Collins et al. | 140/105 |
| 3,548,479 | 12/1970 | Netta et al. | 29/203 DS |
| 3,639,966 | 6/1970 | Scarf | 29/203 D |
| 3,771,208 | 11/1973 | Taylor et al. | 29/203 D |
| 3,813,753 | 6/1974 | Miller | 29/203 DT |
| 3,859,708 | 1/1975 | Keim | 29/203 DT |

Primary Examiner—Carl E. Hall
Attorney, Agent, or Firm—Ralph E. Krisher, Jr.

[57] ABSTRACT

Method of and apparatus for electrical interconnections wherein the interconnections comprise a crimped splice connector folded upon at least one magnet wire segment, at least one filler wire segment, and at least one other wire segment including the step of and means for ensuring that the filler wire segment is devoid of major bends along its length.

10 Claims, 23 Drawing Figures

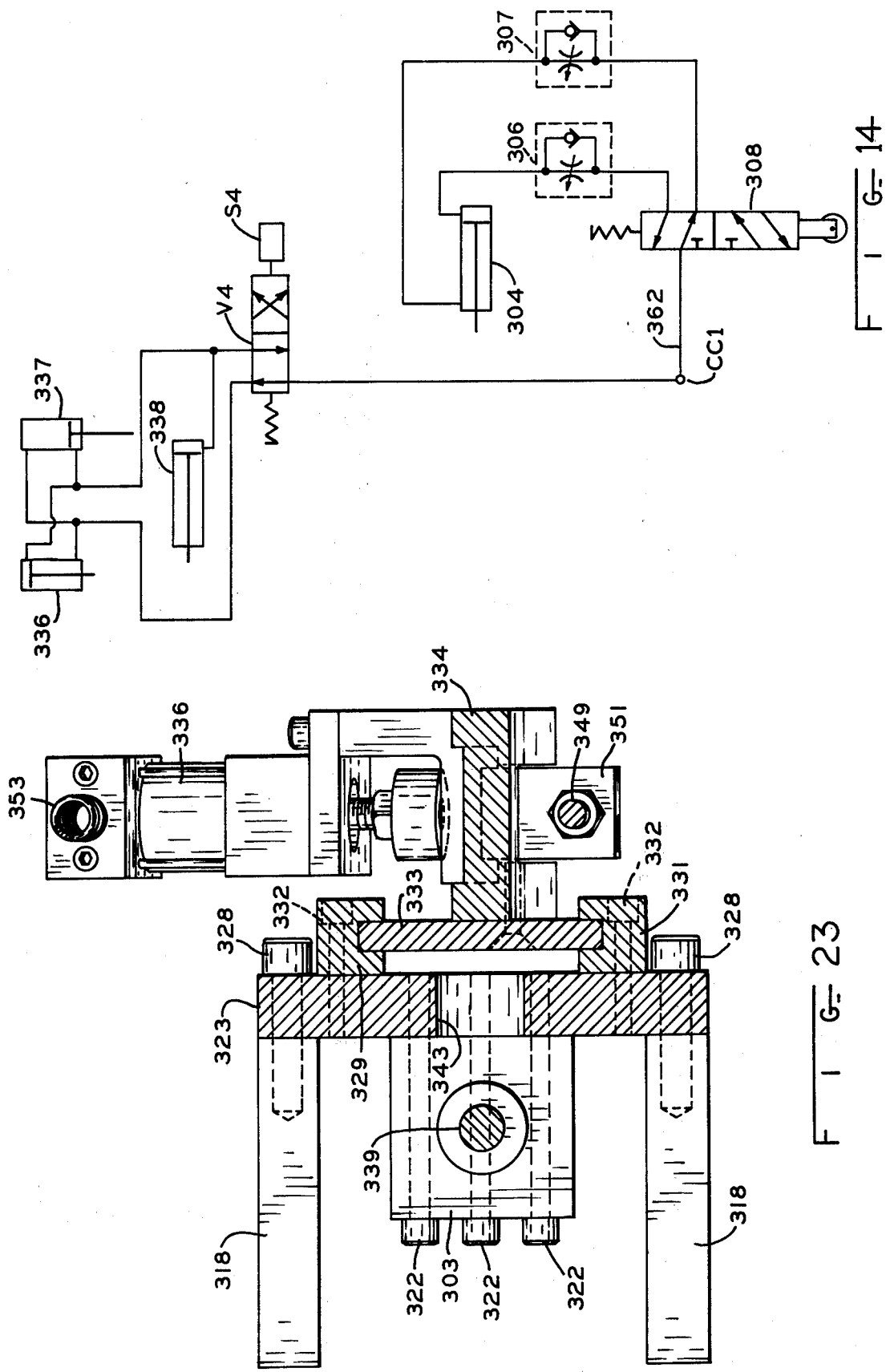

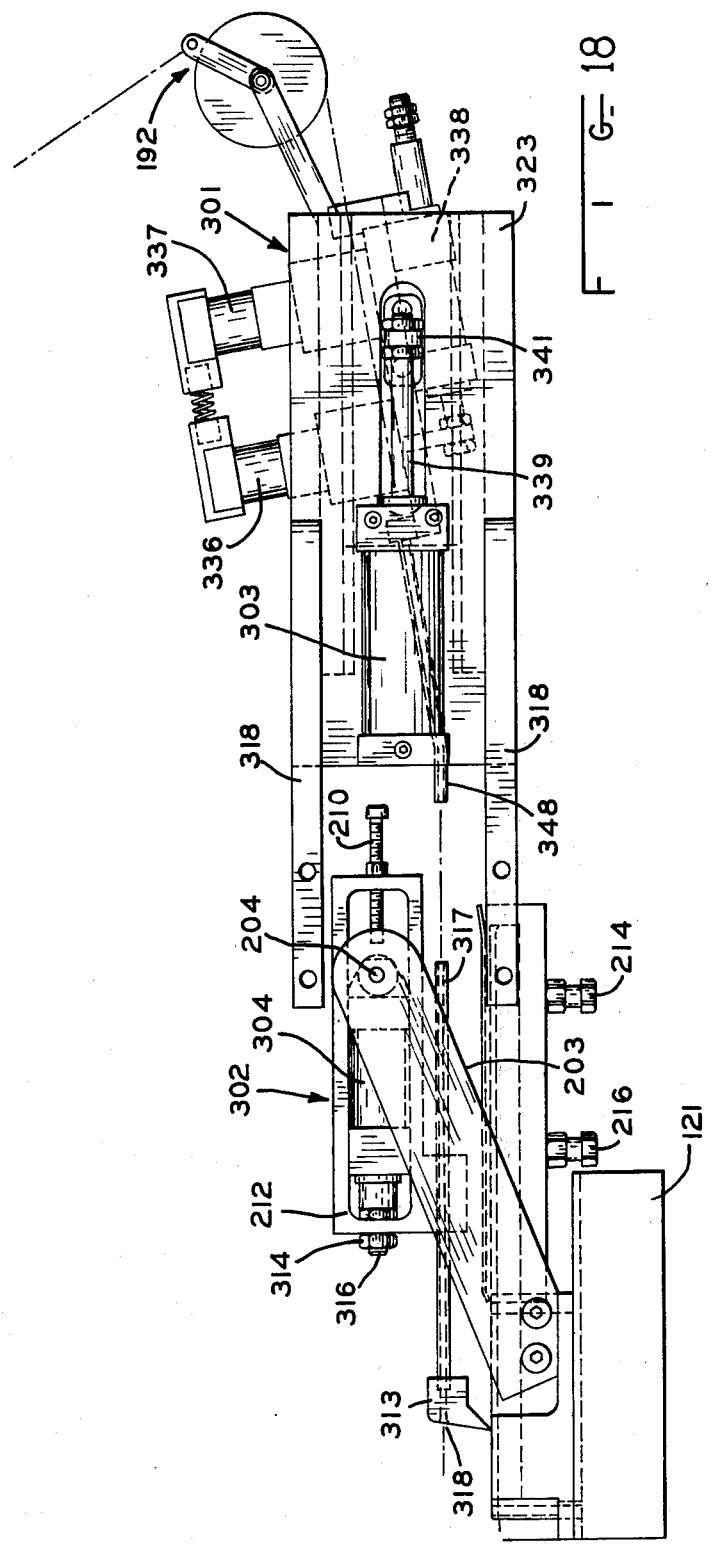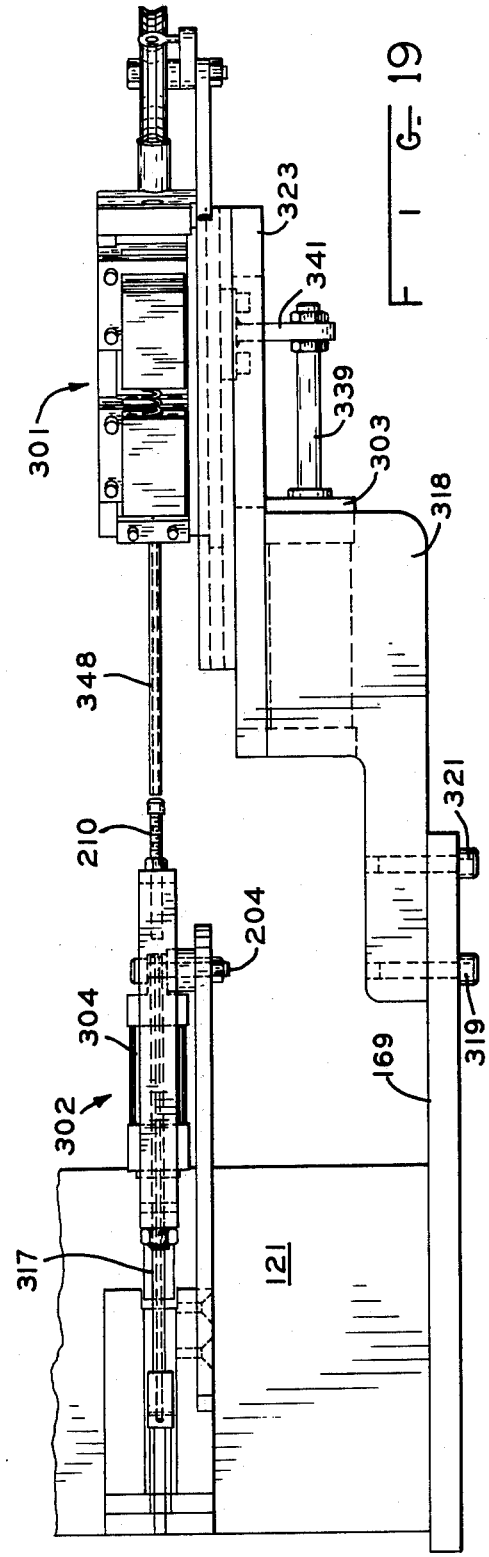
FIG-18
FIG-19

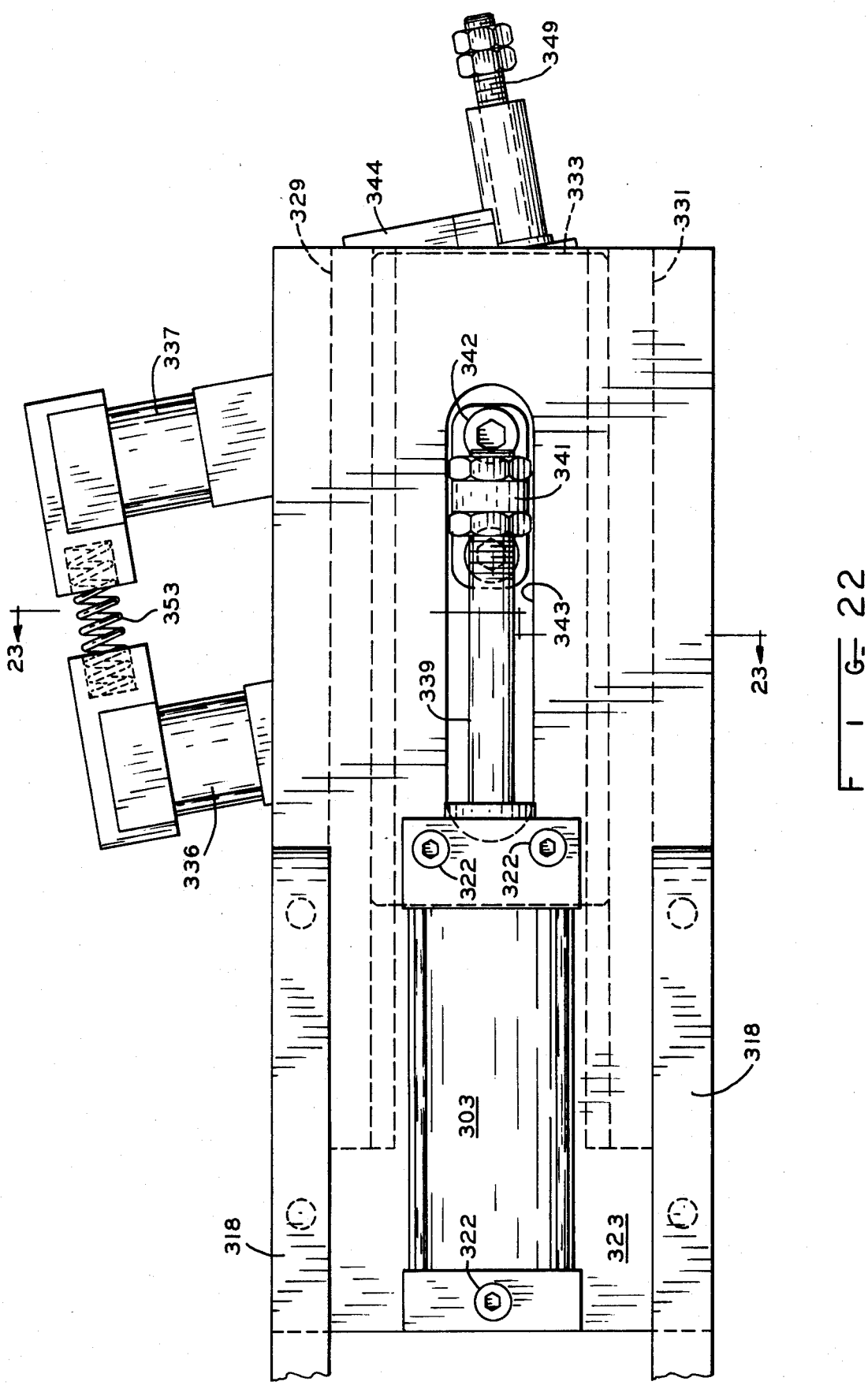

METHODS AND APPARATUS FOR USE IN MAKING ELECTRICAL INTERCONNECTIONS

CROSS-REFERENCE TO RELATED APPLICATION

This application is a continuation-in-part of my co-pending application Ser. No. 671,618 which was filed on Mar. 29, 1976 and which in turn was a continuation-in-part of my then co-pending application Ser. No. 590,707 which was filed June 26, 1975; and which issued as U.S. Pat. No. 3,962,780 on June 15, 1976. The entire disclosures of my related application Ser. No. 671,618 and U.S. Pat. No. 3,962,780 are incorporated herein by reference.

BACKGROUND OF THE INVENTION

The present invention relates generally to methods and apparatus for use in making electrical interconnections and, more particularly, to such methods and apparatus that are utilized in conjunction with making crimped connections involving at least one magnet wire lead of an inductive device such as dynamo-electric machine.

In the manufacture of dynamoelectric machines, the excitation windings or coils are usually made of magnet wire—i.e., copper or aluminum wire covered with a suitable layer of insulation. It has been known for some time that it is generally less expensive to use a crimp connection approach (as opposed to brazing, welding, or soldering) when interconnecting leads or taps from such coils with one or more other wires (e.g., other magnet wire segments or stranded lead wires). It has also been determined, however, that for some of the more demanding applications, it is difficult and expensive (although technically possible) to provided crimped interconnections which will retain suitable conductivity characteristics over a long period of time.

For example, in hermetically sealed refrigerating compressor applications, stator assemblies (including excitation windings and electrical interconnections therewith) are normally exposed to a refrigerant fluid such as, e.g., one of the freon refrigerant materials. In this type of application, an internal failure (e.g., a high resistance connection) usually will require that the sealed compressor be replaced. Accordingly, it is necessary that any crimped interconnection be of very high quality and have a long life expectancy (in the neighborhood of twenty years, for some applications).

The need for crimped connections is especially great for hermetically sealed refrigeration motors with aluminum windings because the magnet wire insulation used for motors of this type creates a practically unsolvable problem when making connections by welding or brazing.

Experience has now shown that reliable connections may be made, but that it is important to control the final height of a crimped interconnection as a function of the cross-sectional area or size of the conductor (or other material) contained within the crimped connector. The optimum crimped connector height varies (as will be understood by persons skilled in the art) from one connector to another, for a given conductor area or size. Thus, it has previously been found to be desirable to provide methods and apparatus for varying the final crimped connector height and for feeding a "stuffer wire", when needed, to a crimping station.

In one prior approach devised by another, a pneumatically operated toggle linkage has been provided, wherein a generally L-shaped arm has been supported at one extremity thereof by an eccentric pin. The other extremity of the arm has been connected to a frame supported ram; and the central portion of the arm has been connected (at a pivot) to one end of another arm. The second end of the another arm then has been interconnected with crimping tooling which was constrained to move along a path toward and away from other crimping tool parts.

In the approach just described, the eccentric pin has been interconnected with a crank arm which, in turn, was connected to a pneumatic cylinder. Then, upon closure of a foot pedal switch by an operator, the pneumatic cylinder could be energized to rotate the eccentric pin from a first rotational position to a second rotational position. The two different rotational positions of the eccentric pin provided two different "effective toggle stroke lengths," and thus have been utilized to provide two different finished crimped connector heights.

When following the approach just described, a stator assembly has been placed in a stator holder, moved to a crimping station, and rotated until a winding lead has been adjacent to the crimping station. It then has been necessary for the operator to mentally determine whether or not the crimp height controlling foot pedal should be depressed.

One variation from the above has been to provide "stuffer" wire feeding apparatus. Again, when such apparatus has been used, it has been necessary for an operator to decide whether stuffer wire should or should not be included in a crimped interconnection.

The above described approaches have not been fully satisfactory for a number of reasons. For example, the methods utilized have relied upon accurate operator recognition of the need for a particular one of two different crimp heights; and accurate operator recognition of whether or not a stuffer wire segment needed to be used. Moreover, in the case of apparatus with which I am familiar, the eccentric pin has been adjustable to only two different discrete positions with the result that the difference between a maximum crimp height and minimum crimp height has always been the same, even though it might be desired to vary such difference.

In crimp connection making apparatus, bits and pieces of wire, connectors, and foreign particles tend to appear and accumulate around a crimping station. It will be understood that it would also be desirable to provide methods and apparatus for removing such pieces and particles.

I have now also determined that connections not having desirable characteristics may be produced as a result of stuffer wire misplacement within a crimped connector having magnet wire therein. As used herein, "magnet wire" indicates electrically insulated copper, aluminum, aluminum alloy, or any other electrically insulated conductive material used in the manufacture of motors, generators, alternators, or transformers wherein electrical insulation of the conductive material is established and maintained by a thin, adherent, film-like coating on the conductive material. This coating, sometimes referred to as "varnish," adheres tenaciously to the conductive material, and is very tough yet flexible thereby to prevent cracking or crazing thereof during coil winding, coil placing, and coil shaping operations.

Because of the nature of the insulative coating on magnet wire, connectors having a multiplicity of serrations have been used. During a crimped-connection making process, the teeth or serrations of the connector clips are intended to pierce the magnet wire insulative coating and establish a low resistance interconnection between two or more magnet wire segments. In practice however, I have found that such interconnection may not be established if stuffer wire material is adjacent to the serrated surface of a clip while it is being crimped. This result seems to occur because the stuffer wire tends to fill the notches or grooves adjacent to the teeth of the clip, and inadequate penetration of the magnet wire insulation results.

Accordingly, it it a general object of the present invention to provide methods and apparatus whereby stuffer wire segments are fed and positioned in predetermined desired positions relative to a serrated connector clip and two or more magnet wire segments.

It also is an object of the present invention to provide improved methods and apparatus for feeding or advancing stuffer or filler wire into a crimpable connector smoothly and without interference with portions of one or more of such connectors.

It is another object of the present invention to provide improved methods and apparatus wherein the effective final height of a crimped interconnection may be varied between minimum and maximum heights, and wherein the difference therebetween may also be easily changed or varied.

It is still another object of the present invention to provide new and improved crimping apparatus of a type that utilizes eccentric means for providing interconnections of different configurations, and wherein means are included whereby the effective range of adjustment of the eccentric means may be substantially continuously varied between two different limits.

It is a still further object of the present invention to provide new and improved methods and apparatus for removing scrap particles from the vicinity of the crimping station of crimp connection apparatus.

SUMMARY OF THE INVENTION

In carrying out the above and other objects of the invention, in one preferred form thereof, a method is provided that involves making at least two different electrical interconnections with at least two wires extending from windings supported on a dynamoelectric machine core. Preferably, the method includes moving the core, windings, and at least two wires toward a wire connecting device; orienting and positioning a first one of the at least two wires relative to the device so as to position the first one of the at least two wires at a connecting station of the device; and conditioning the device to form a first one of at least two different connection configurations while so positioning the first one of the at least two wires. Thereafter, according to my preferred method I form, at the connecting station of the device, a first electrical interconnection involving the first one of the at least two wires, with the first electrical interconnection having a first one of at least two different connection configurations. I then orient and position a second winding lead relative to the device so as to position the second winding lead at a connecting station of the device, and condition the device to form an interconnection of a second connection configuration. The electrical interconnection of a second configuration is then made at the connecting station of the device; and subsequently, the stator assembly is moved away from the device. Indicia that indicate the relative orientation of the stator assembly (or parts thereof) may be utilized to condition the device to establish connections of desired different configurations.

In one illustrated form of apparatus a stator holder is provided which is operatively interconnected with indicia means which are in the form of limit switch actuating cams. Movement of the stator holder, with the winding leads positioned in predetermined fixed positions relative thereto, causes corresponding movement of the cams. The cams in turn establish the condition of control means that are operative to condition the apparatus so that crimped interconnections of predetermined final configurations are established.

In accordance with other aspects of the invention, there is provided a method that involves adjusting the operational mode of a prime mover that controls the effective stroke of crimping tooling. The difference between minimum and maximum tooling movement is substantially continuously variable. In the illustrated form of apparatus, the prime mover is a pneumatic cylinder, and a rack is driven with the rod of the cylinder. The rack meshes with and rotates a drive pinion that is rotationally locked with eccentric means which support a toggle linkage. Means are provided on the pneumatic cylinder for controllably adjusting the stroke of the cylinder, and thus rotational movement of the eccentric means is controllably varied.

In accordance with another aspect of the present invention, I provide a method of scrap removal which includes the steps of exhausting a pneumatic cylinder; guiding the exhausted air to a venturi chamber and thereby establishing a vacuum adjacent a crimping station thereby to collect scrap material; and directing the scrap material, along with the exhausted air, away from the crimping station. Illustrated apparatus that embodies other features of the invention includes a venturi defining structure and a vacuum (or low pressure) defining structure positioned adjacent to a crimping station.

In accordance with yet another aspect of the present invention, I place one or more segments of magnet wire along a serrated surface of a connector, and then place a segment of filler wire (when needed) consistently in a position removed from the serrated surface. Preferably, I place the filler in a desired position by feeding it through a clip feeding mechanism. This technique can be used to ensure that the filler wire will be positioned above magnet wire segments that are positioned along a serrated connector surface. Preferably, when a segment of filler is to be used, a length of filler material is advanced through the feeding mechanism, and a portion of filler at the end of the segment is included in the crimped connection. The balance of the segment of filler material then, preferably, is retracted through or into the feeding mechanism and thus straightened. With a preferred arrangement of parts, the filler wire end (while being advanced) cannot engage sides of connector clips and thus buckle.

BRIEF DESCRIPTION OF THE DRAWINGS

The subject matter which I regard as my invention is particularly pointed out and distinctly claimed in the concluding portion of the specification. My invention itself, however, both as to its organization and method of operation, together with further objects and advantages thereof, may best be understood by reference to the following description taken in connection with the accompanying drawings wherein:

FIG. 14 is a schematic representation of modified portion of the system of FIG. 11;

FIGS. 18 through 23 are details of a wire stuffing mechanism embodying some aspects of my invention in another form.

DESCRIPTION OF THE PREFERRED EMBODIMENTS

Figure 1:
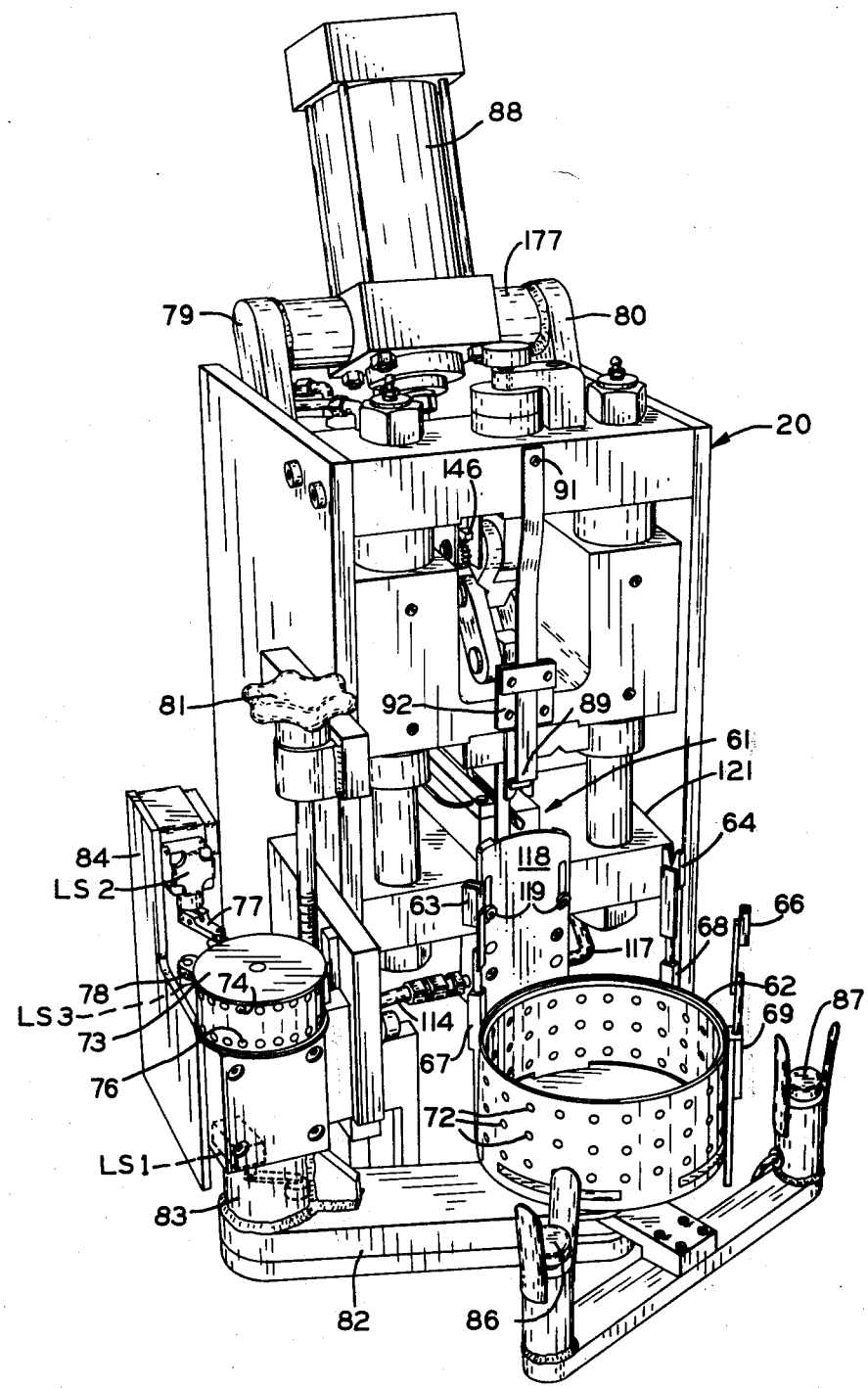
FIG. 1 is a front perspective, with parts removed and parts broken away, of apparatus that embodies certain aspects of the present invention in one form thereof, and which may be utilized when practicing the invention in another form.

With reference now to FIG. 1, I have illustrated a new and improved apparatus, generally denoted by the reference numeral 20, which may be utilized to carry out and practice the invention in preferred forms thereof.

Figure 6:
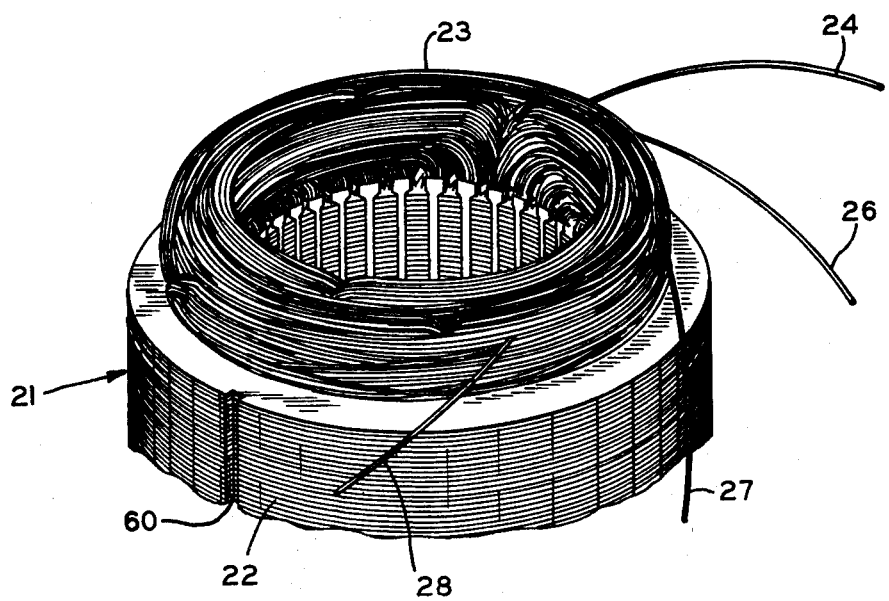
FIG. 6 is a view of a portion of a stator assembly that is to be operated upon when performing methods and utilizing apparatus embodying the invention.

With reference now to FIG. 6, it will be appreciated that a stator assembly 21 has been illustrated which includes a magnetic core 22 and excitation windings 23. The assembly further includes four winding leads 24, and 26–28. As will be understood, the leads 24 and 26–28 extend from different ones of (or different sections or poles of) the excitation winding 23. For example, lead 24 may be connected to one end of an auxiliary winding and lead 26 may extend from the other end of the same winding. Leads 27 and 28, on the other hand, may represent the ends of a main winding phase.

It should be understood that the stator assembly 21 has been illustrated only for purposes of discussion and that the number of loads extending from a given stator assembly may be more or less than those shown. For example, additional leads may extend from a winding when multi-speed operation is desired. Moreover, in the event that part of the winding has been inadvertently broken, the two broken ends may be pulled out externally of the stator assembly so that they extend in a manner similar to that illustrated for lead 24. The two broken ends may then be interconnected, according to the invention, in order to effect a repair of the stator assembly winding.

Assuming, for a moment, that leads 24 and 26 represent the ends of an auxiliary winding and that leads 27 and 28 represent the ends of a main winding, one common practice would be to establish an interconnection involving leads 26 and 27 and a stranded external lead wire. This lead then usually would be connected to one side of a conventional power supply during motor operation. Lead 24 (assuming that it extends from the other end of an auxiliary winding) would then be interconnected with a stranded lead wire and under normal conditions, be connected through a capacitor or suitable switching contacts to the other side of the power supply. Lead 28 (assuming that it extends from the other end of the main winding) would then be interconnected through suitable circuit means to the other side of the power supply.

Figure 7:
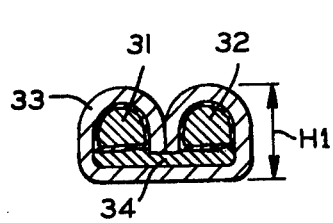
FIGS. 7, 8, 9, and 13 are views of various interconnection configurations that may be provided when practicing the invention disclosed herein.
Figure 8:
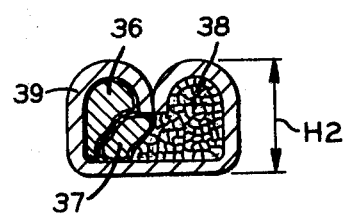
Figure 9:
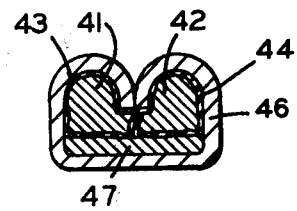

FIGS. 7–9 represent different types of crimped interconnections involving magnet wire leads such as those discussed hereinabove in connection with FIG. 6. In FIG. 7, for example, there has been illustrated an interconnection that represents the repair of an inadvertently broken winding turn. In FIG. 7, the numerals 31, 32 denote the broken strands of a winding that have been crimped together during a repair procedure. Contained within a crimped connector 33 is a flattened piece of conductive material 34 which is referred to herein as a stuffer wire. If the wires 31, 32 are formed of aluminum, then the stuffer wire 34 also, preferably, is aluminum. When the magnet wires are formed of copper, the stuffer wire may be of aluminum or copper. It will be noted that, during the crimping process, the wires 31, 32 and 34 are pressed within the confines of the crimped connector 33. It will also be noted that the height H1 of the crimped interconnection of FIG. 7 is less than the heighth H2 of the crimped interconnection shown in FIGS. 8 and 9.

FIG. 8 has been drawn to represent an interconnection involving two lead wires extending from a stator assembly (for example, lead wires corresponding to leads 27 and 26 of the stator assembly 21). These leads have been denoted by the numerals 36, 37, and a stranded lead wire comprised of a number of individual strands has been indicated by the reference numeral 38 within the crimped connector 39.

In FIG. 9, two relatively large strands of magnet wire 41, 42 (each surrounded by an insulating covering 43, 44) are shown interconnected and bounded by a crimped connector 46. In the FIG. 9 illustration, a length of stuffer wire 47 has been utilized in order to increase the cross-sectional area encompassed by the crimped connector 46.

Figure 13:
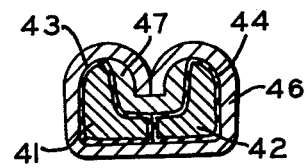

Close review of FIGS. 7 and 9 will reveal that the filler or stuffer wire segments 34 and 47 are located along the relatively flat, bottom portions of connectors 33, 46. I have now determined that it is generally preferable for magnet wire segments to be positioned along the bottom of connectors 33, 46 and the stuffer wire segments positioned thereover. This particular relative placement of magnet wire and stuffer wire segments is preferable because, depending on the final crimp height, actual volume of wires contained therein, and characteristics of the magnet wire insulation; a higher percentage of defective or "high resistance" connections may result if the stuffer wire is below the magnet wire (as shown in FIGS. 7 and 9) rather than above it. FIG. 13 shows the more desired configuration of a connection that can now be consistently attained by practicing my invention.

Although it is not initially apparent, the connectors of FIGS. 7, 8, 9, and 13 are all substantially identical, one to another, prior to being crimped about the respective ones of the interconnected wires. For example, each of the connectors are substantially identical to the connector 48 which illustrates a type of clip available from Essex International of Fort Wayne, Ind., and identified by that company as clip number 851218-C17. It is generally specified, for these particular clips, that suitable results will be obtained when the final crimp heighth ranges from 0.065 inches to 0.085 inches (1.651 millimeters to 2.159 millimeters). Thus, "H1" for the above identified clip should be no less than 0.065 inches, and "H2" should be no greater than 0.085 inches. A satisfactory connection with the above identified clip is established when the circular mil area of the wire contained within the finished crimped connection ranges from 3,000 circular mils to 6,500 circular mils. It should be understood that the circular mil area contained within a crimp and the final heighth are subject to permissible manufacturing tolerances and a range of heights (for example plus or minus 0.003 of an inch) will still provide a suitable connection for a given circular mil wire area.

Figure 10:
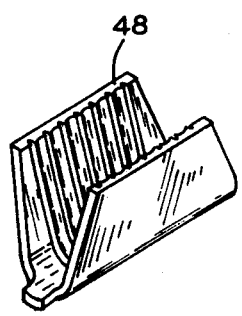
FIG. 10 is a perspective view of a connector clip, known per se, that is shown in other drawing views.

With continued reference to FIG. 10, it will be noted that clips such as the clip 48 are provided with a number of serrations or grooves which bite into and pierce the insulation about the magnet wires 31, 32, etc. in FIGS. 7-9. In this manner, a low resistance electrical interconnection is established between each wire contained within a connector clip and the body of the clip itself. As mentioned hereinabove, however, low resistance interconnections can be more consistently established when the magnet wires are positioned at the bottom of the crimped connector clip.

With reference now once again to FIGS. 7-9, it will be understood that it is a routine procedure to plan, in connection with the production of a given electric motor stator assembly (such as the stator assembly 21), which wires are to be interconnected with each other and to plan whether a minimum heighth crimp (heighth H1) or a maximum heighth crimp (H2) will be needed to ensure that a reliable electrical interconnection will be made. Moreover, it is a routine procedure to plan in advance, for a given stator model, whether a length of stuffer wire will be needed in order to ensure that the final crimped interconnection will have adequate conductor contained therewithin to ensure a suitable and reliable electrical interconnection.

It will be noted, prior to commencing a description of one preferred method, that if too great an area of conductor wire is contained within a crimp of a given height, the wires may be cut or severed and a poor connection will result. On the other hand, if the crimp has not been closed to a small enough height for a given conductor area, a relatively loose interconnection may be provided, or the insulation on the magnet wire segments may not be adequately pierced, and a suitable interconnection may not be established.

Turning now to FIG. 1, one preferred method by which the above desired results may be obtained will be explained in conjunction with the apparatus 20. It is first noted that a preferred method involves placing a stator core assembly (such as the one shown in FIG. 6) in a desired position relative to the crimping apparatus 20. More specifically, one or more lead wires extending from the stator assembly are positioned adjacent to a crimping station 61, and the step of positioning or orienting the lead wires adjacent to the crimping station conditions the apparatus 20 so that a stuffer wire segment will be provided if needed; and the tooling of the apparatus will be adjusted so that a crimped connection having a final desired planned height will be established for the interconnection involving the particular magnet wire lead (or leads) that has been positioned at the crimping station.

For convenience, a slot or key may be provided in a stator holder 62 so that the stator assembly 21 cannot be positioned therein in a strictly random orientation. For example, an internal key or member may be utilized that would interfit with a marker notch 62 (see FIG. 6) of the stator assembly 21. However, it also is possible to paint or otherwise provide reference indicia on the core of the stator assembly 21 and then visually align such indicia with a reference part of the stator holder 62 in order to establish an initial predetermined desired orientation of the stator assembly relative to the stator holder.

The magnet wire leads of the stator assembly then are positioned and held in lead holders 63, 64, and 66.

The various lead holders 63, 64, and 66 are each supported from a post that is in turn fastened to the stator assembly holder by substantially identical brackets 67-69. The brackets 67-69 may be fastened to the stator holder 62 by screws that thread into threaded holes 72 which are positioned around the stator holder 62.

The holder 62 is interconnected with a drum 73 which has a first and second series of holes 74, 76 located therein. These holes are tapped and are disposed with an angular spacing equal to the angular spacing of holes 72 in stator holder 62. Cam members are mounted (for example with Allen screws) to the cam cylinder or drum 73. These cams are identified by numerals 96, 97, 98 in FIG. 2. Such cams are provided so that they may engage limit switch arms 77 or 78. In the event that limit switch arm 77 is actuated, it will condition the apparatus 20 to establish a crimp height of a desired minimum height. On the other hand, the actuation of limit switch 78 causes a length of stuffer wire to be fed into the crimping station 61 prior to a crimping operation, so that stuffer wire will be included in the final interconnection.

With the foregoing in mind, it will be understood that production operations will be planned so that leads exiting from different portions of the stator will be placed in a next adjacent lead holder 63, 64, 66; and cams will be located on drum 73 so that apparatus 20 will be conditioned to make an interconnection of the proper configuration whenever any given lead is positioned at station 61. Thus, as the stator holder 62 is rotated (i.e., oriented so as to present a different lead holder to the crimping station 61) drum 73 will rotate in synchronism therewith and, depending upon the presence or absence of cams in the series of holes 74, 76; either one or both of the limit switch arms 77 or 78 will be deflected, and the apparatus 20 will be conditioned to provide a crimp configuration having precisely the desired configuration.

For a given stator height, adjusting knob 81 is manually adjusted to raise or lower the entire stator manipulating portion of the appearance 20 so that the lead wires of the given stator will be approximately level with the station 61. The stator manipulating structure includes the stator holder 62, a swing arm 82, the pivot post 83, cylinder or drum 73, and limit switches which are supported by a plate 84. The heighth of these parts are adjusted with knob 81 so that leads will be positioned at least approximately at the same height as the crimping tooling at the station 61.

After the magnet wire leads that extend from a stator assembly (positioned in the holder 62) are placed in the lead holder 63, 64 etc.; the stator holder is oriented so that a first one of the leads are positioned at the crimping station. Thereafter, the operator of apparatus 20 actuates a pair of switches 86, 87 and a foot switch. This in turn energizes the apparatus 20 to establish one crimped interconnection. The crimped interconnection would, in most cases, involve at least one magnet wire lead and a piece of stranded lead wire which is positioned (along with the one or more magnet wire leads) in the crimping station 61, all as will be understood by persons of ordinary skill in the crimp connection art.

After a crimp connection has been completed, a main pneumatic power ram 88 retracts the rod thereof so as to raise (as viewed in FIG. 4) the upper portion of the crimping tooling. In order to prevent the crimped connection from sticking in the upper tooling, a stripper finger 89 is provided for disloding interconnections from the movable tooling. The finger 89 may be formed of any suitable material and may, for example, be a piece of spring steel fastened to the frame of the apparatus 20 by a screw 91 and a bracket 92 all as is clearly revealed in FIG. 1.

Figure 2:
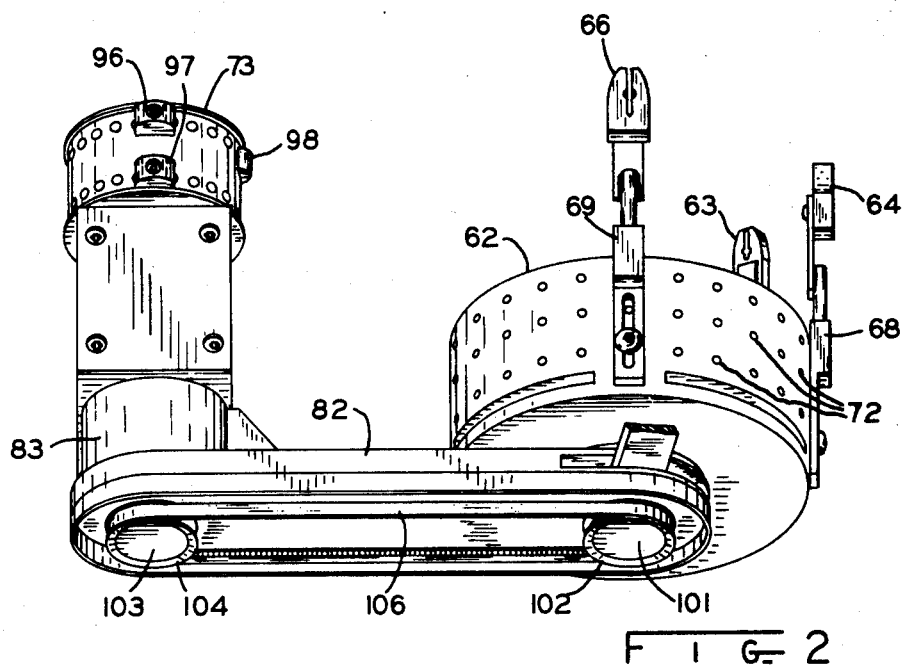
FIG. 2 is a perspective view of some of the parts of the apparatus shown in FIG. 1.

It will be seen from FIG. 2 that cams 96-98 are therein revealed, and that the stator holder 62 is supported by a shaft 101 which has a timing belt pulley 102 secured thereto. Similarly, the cylinder or drum 73 is supported and rotates with a shaft 103. A shaft 103 which has fixed thereto a timing belt pulley 104. A timing belt (or other non-slipping drive means) 106 is provided to interlock the stator holder 62 and the drum 73. As the stator holder 62 is rotated so as to reorient a stator assembly relative to the crimping station 61 (see FIG. 1), the drum 73 is rotated so as to move different arcuate segments thereof into proximity with the previously mentioned limit switch arms.

Figure 3:
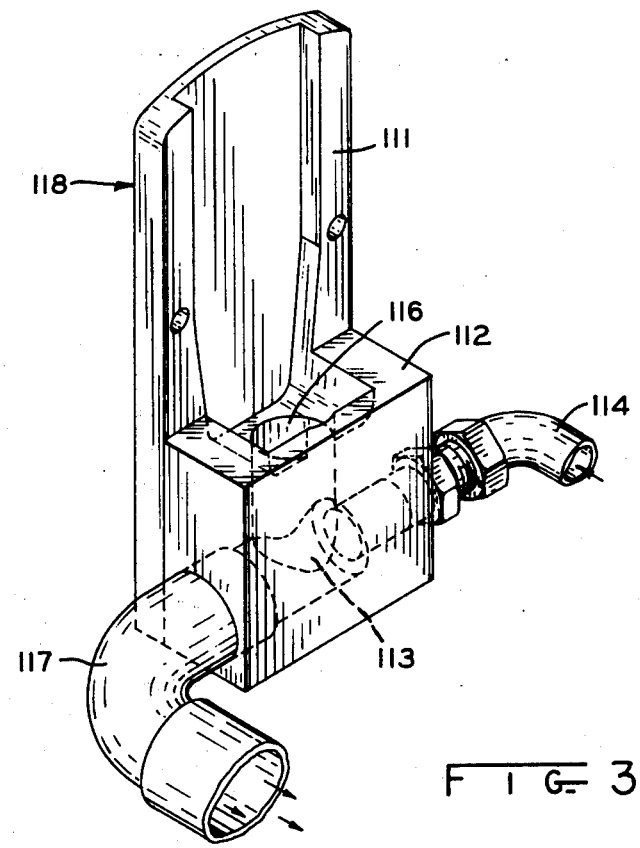
FIG. 3 is a perspective view of still another part of the apparatus shown in FIG. 1.

The structure of FIG. 3 includes a collecting block 111, which is machined as a unitary structure with a manifold block 112 that includes a venturi 113. The exhaust ports of the main pneumatic cylinder 88 are interconnected with conduit 114 and, as cylinder 88 retracts the rod thereof, the air exhausted from the cylinder is passed through conduit 114 and across the venturi 113 within the block 112. Due to the venturi effect, a low pressure or near vacuum condition is established in the region 116 so that any particles in the vicinity of region 116 will be moved by suction forces into the venturi 113. The particles so moved, along with the air moving within conduit 114, are then exhausted along an exhaust tube 117 to a scrap collection bag or other container.

This vacuum device, generally denoted by the reference numeral 118 in FIG. 3, is clearly revealed in FIG. 1 and is fastened adjacent to the crimping station by means of a pair of screws 119 which fasten the vacuum arrangement to the base 121 of the apparatus 20. Thus, during and after the formation of each crimped connection, a vacuum is applied by means of the vacuum device 118 in the vicinity of the crimping station 61 and scrap wires, pieces of severed connector material, and other debris in the area of the crimping station 61 are exhausted (along with the exhaust of the main drive cylinder 88) to a not shown scrap collecting container.

The actual mode of operation of the apparatus 20 will now be described by having joint reference to FIGS. 1 and 4. At the outset, it should be noted that only four different pneumatic cylinders need to be utilized in conjunction with, and during the operation of, apparatus 20 as shown in these figures. The first of these cylinders is the previously mentioned cylinder 88 which, in one reduction to practice, was a Hydro-Line air cylinder series LR2U (purchased from the J. N. Fauver Company of 318 Mart Street SW, Grand Rapids, Mich. The cylinder 88 had a four-inch stroke and a 3-¼ inch bore, and was a trunnion mount cylinder with a one-inch diameter rod. The rod end 126 was provided with sufficient thread to permit it to be easily threaded into the yoke 127 and still have sufficient thread to permit the use of jam nut 128.

A second cylinder 129 was a "Tiny Tim" cylinder with a two-inch stroke, 1-⅛ inch bore, 5/16 inch rod, Model DTF. A third cylinder 131 was also a Tiny Tim cylinder, MODEL TC with a ¾ bore and 1 inch stroke. The just referenced Tiny Tim cylinders were purchased from Kundinger Fluid Power, 100 Alloy Drive, Fenton, Mich.

A fourth cylinder was contained within the wire stuffer unit 132 which was purchased as an assembled package from Essex International, of Engle Road, Fort Wayne, Ind. The designation of the wire stuffer feed mechanism 132 by Essex International was "wire stuffer, US-10". When the cylinder of the wire stuffer unit 132 is operated, it advances a length of the stuffer wire.

Other cylinders may be used when a modified process and apparatus are used. Those cylnders are shown, for example, in FIG. 14, and are discussed hereinbelow.

Figure 4:
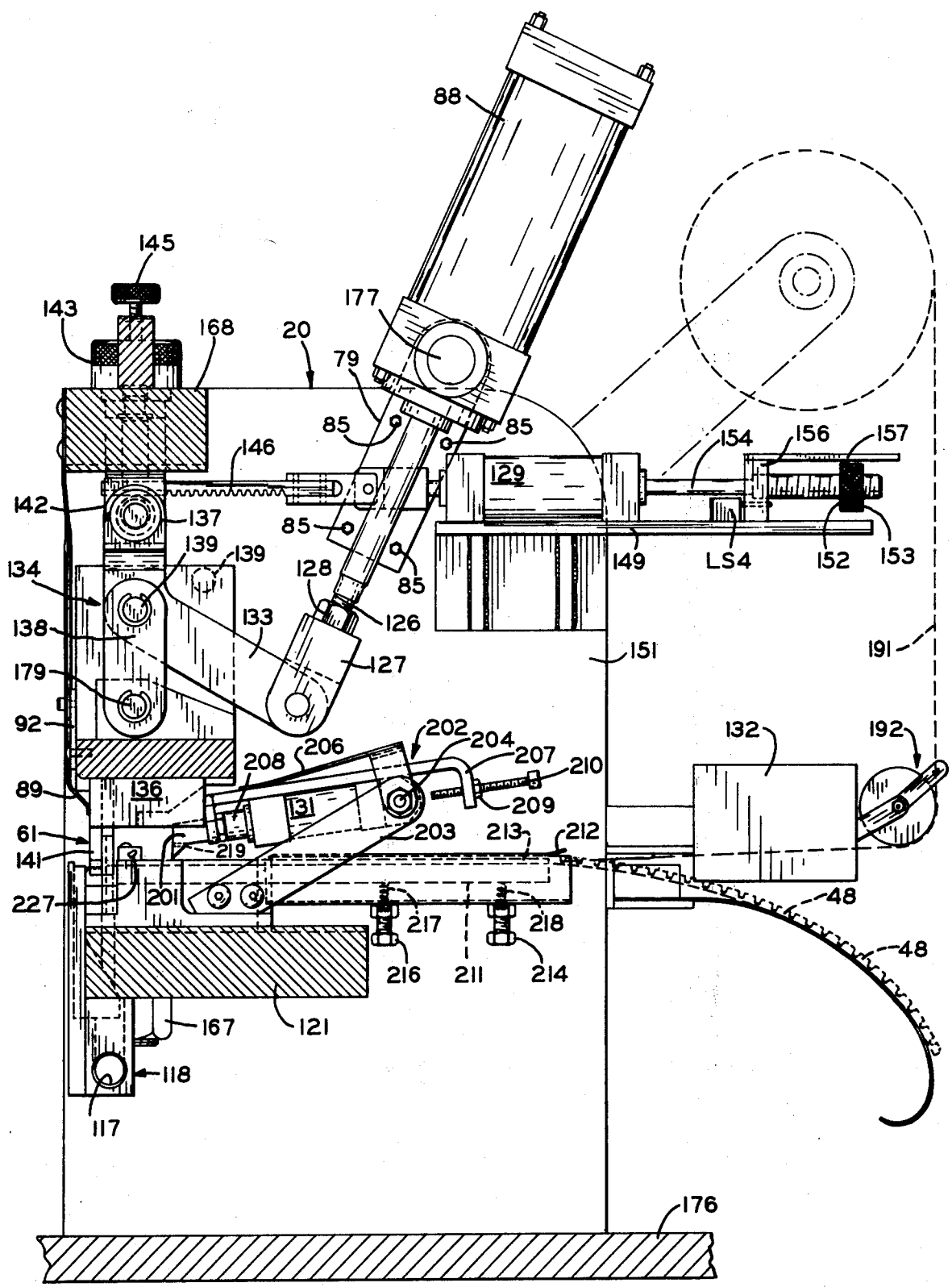
FIG. 4 is a side elevation, with parts in section and parts removed, of the apparatus of FIG. 1.
Figure 5:
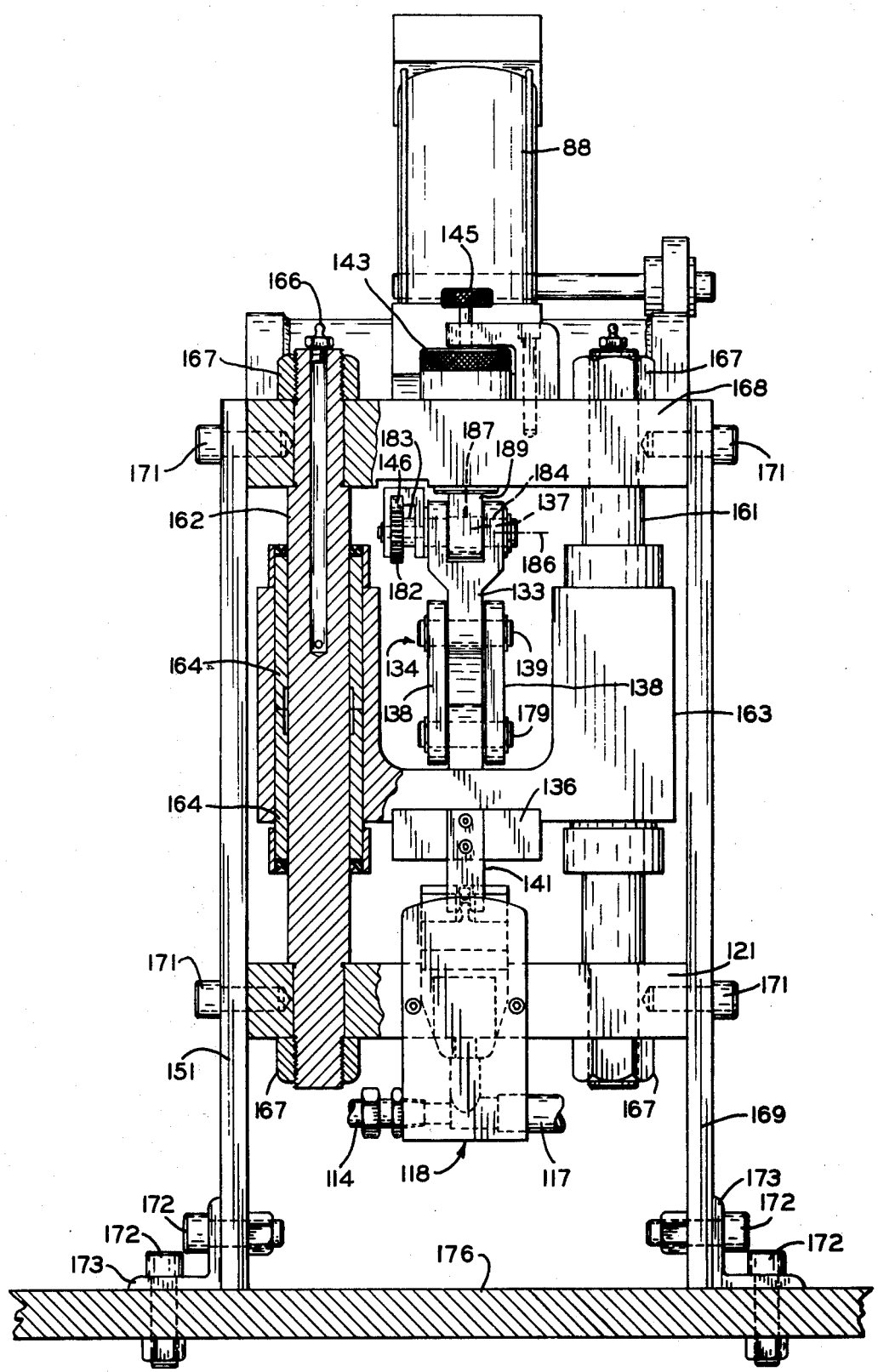
FIG. 5 is a front elevation of the apparatus of FIG. 1, with parts removed, parts broken away, and parts in section.

The cylinder 88, in FIG. 5, has been shown with the rod thereof in its fully extended position at the end of a power stroke. In this position, arm 133 of toggle linkage 134 has moved to its lower-most position and driven the upper tooling block 136 to a crimping position. When the cylinder 88 retracts, it pivots the arm 133 upwardly about an eccentric pivot pin 137; and tooling block 136 moves vertically upwardly, with link members 138 raising the pivot pin 139 to a dotted line position thereof as illustrated by phantom lines in FIG. 4.

The lower most position of the movable tooling or die 141 is determined by two different mechanisms in the apparatus 20. A first of these is the support block 142 which may be adjusted vertically by means of an adjusting knob 143 which is threaded through an upper frame member 168 and carries the support for the eccentric pin 137. In addition, the orientation of the eccentric pin 137 has some control on the limits of travel of the tooling 141.

Gross adjustments for different crimp connectors (or clips) are made by loosening lock bolt 145 and adjusting the hand wheel or knob 143 so as to raise or lower the eccentric pin 137. On the other hand, the angular orientation of the eccentric pin 137 is determined by the relative angular position of a drive pinion that is interconnected therewith and driven by a rack 146 (by the pneumatic cylinder 129).

It will be noted that the pneumatic cylinder 129 is supported on a plate 149 which has been welded to a side frame member 151 of the apparatus 20. The stroke of the cylinder 129 is controlled by adjusting a stop nut 152 (along with jam nut 153) to different axial positions along the threaded extension of the cylinder rod 154 of cylinder 129. By moving the stop nut 152 to the left (as viewed in FIG. 4), movement of rod 154 ceases earlier in a cylinder stroke because the stop nut 152 is arrested from further movement by its engagement with a stop member 156 carried by the support plate 149.

If desired, indicia may be provided along the plate 157, such indicia corresponding to predetermined amounts of angular movement of the eccentric pin 137. It also should be noted that a limit switch LS4 is supported on plate 149 and is actuated whenever nut 152 has moved into abutment with the stop member 156.

With reference to FIG. 5, it will be noted that a number of heavy cylindrical guide rods 161, 162 are provided and that an upper tooling carriage 163 (which supports tooling block 136) is supported for vertical movement along the guide rods 161, 162. Bushings 164 and lubrication means 166 are provided as will be understood. The rods 161 and 162 are fastened with a number of nuts 167 to upper frame member or plate 168 and the base plate or lower frame member 121.

The pair of side plates 151, 169 support the plates 121 and 168 and are interconnected therewith with a number of bolts 171. The entire frame for the apparatus 20 is fastened by any suitable means (as illustrated for example by bolts 172 and feet 173) to a support 176.

It will be noted from FIG. 1 that cylinder 88 is supported from the frame of the apparatus 20 by means of a shaft 177; and from FIG. 5 that the links 138 of the toggle linkage 134 are interconnected to the carriage 163 by means of a pivot pin 179. As the toggle linkage 134 moves under the influence of cylinder 88, the carriage 163 moves along the guide rods 161, 162. The previously mentioned pinion, which controls the relative position of the eccentric pin 137, has been shown at 182 in FIG. 5 and it will be understood that the pinion 182 and link 133 are mounted on round shaft journals 183 and 184. However, the portion of the shaft or pin located between the arms of link 133, although round, is eccentrical or offset relative to journals 183 and 184. Thus, as pinion 182 is rotated, the center of the shaft journals 183, 184 (represented by the line 186) will either be raised or lowered depending on the angular rotation of the pinion 182 and the eccentric pin portion 187. The center of eccentric 187 is offset about 0.010 of an inch (0.254 millimeters) from the center of portions 183, 184. Thus, 180 degrees of rotation of pinion 182 can effect 0.020 of an inch of movement of the centerline of journals 183 and 184. Accordingly, the eccentric supported by carrier 189 can be used to vary crimp heights by as much as 0.020 of an inch (0.058 millimeters). The location of the carrier 189 relative to the frame of apparatus 20 is also adjusted by turning the knurled adjusting knob 143, as needed, for initial machine set up for any given stator model or model of connector clip.

By considering together FIGS. 1, 4, and 5, it will be seen that the shaft 177 is supported by arms 79 and 80 which in turn are fastened to side frame members or plates by suitable means such as bolts 85 (see FIG. 4).

With continued reference to FIG. 4, it will be understood that, just prior to commencement of a crimping operation, an individual crimpable connector is located at the crimping station. Then, if the limit switches interconnected with limit switch arms 77 and 78 of FIG. 1 are closed, cylinder 129 and the wire stuffer cylinder will be actuated. In FIG. 4, the stuffer wire has been denoted by the reference numeral 191, and is shown in phantom as it is fed through guide means 192 then along the path of the interconnected crimpable connectors or clips 48.

For emphasis, it is again noted that the cylinder for the wire stuffer 132 will or will not be advanced, depending on whether the limit switch associated therewith has been actuated by a cam carried on the cylinder 73 of FIG. 1. In addition, cylinder 129 will or will not be actuated so as to change the orientation of the eccentric pin 137, depending upon whether the limit switch for actuation of cylinder 129 has or has not been actuated by a cam carried on the cylinder 73. If cylinder 129 has been actuated, it will have advanced rack 146 to the left as viewed in FIG. 4 until the stop nut 152 has closed limit switch LS4 (which readies apparatus 20 for a crimping operation) and abutted against the frame 156.

At this point, it is mentioned that other means may be used to indicate the forward-most position of the stop nut 152. For example, a flat washer may be trapped between the stop nut 152 and jam nut 153, and such flat washer may then be utilized to close a limit switch. Alternatively, photoelectric or other devices may be used.

Once the limit switch LS4 has closed, and the hand buttons 86, 87, and switch FS1 have been closed; ram 88 is energized to move toggle linkage 134 to its "extended" or crimping posture as shown in FIG. 4, and a crimp connection is made which will involve the lead wires that just previously have been positioned at the crimping station 61. The apparatus 20 then automatically (due to an electrical time delay as will be described in more detail hereinafter) returns ram 88 to its initial position; and the exhaust from ram 88 is directed to the vacuum means 118 for the purpose described hereinabove.

During the exhaust stroke of ram 88, shop air is supplied to the cylinder 131 so as to extend the rod thereof, and advance push pawl or "clip feed pawl" 201 attached to the end thereof. As ram or cylinder 131 is actuated, it advances a new crimp connector to crimping station 61, it being noted that a reel or other supply of crimp connectors 48 are located in close proximity to the apparatus 20. The mechanism 202, which is utilized to advance the crimp connectors to the crimping station, has been known heretofore and further explanation is not deemed necessary, it being sufficient to note that the entire mechanism 202 is supported from the machine frame by an arm 203 which pivotally supports (at pivot 204) the cylinder 131, and rigidly supports a spring arm 206. The arm 206 biases the cylinder 131 downwardly to ensure that the push pawl 201 will engage a clip 48 and advance it into the crimping station 61. On the other hand, spring arm 206 is sufficiently weak to let the cylinder 131 swing up as it retracts, so that the leading edge of the pawl 201 can ratchet past the clips 48 that are therebeneath. The mechanism 202 also includes a motion limiting arm 207 which moves with rod 208, and thus push pawl 201. The rear end of arm 207 carries an adjustable stop device in the form of screw 210 and jam nut 209. The effective or actual stroke of rod 208 then may be adjustably varied by threading screw 210 into or out of arm 207. The screw 210 abuts against the blind end of cylinder 131 to prevent continued movement of rod 208 during each stroke thereof. Thus, the stroke of rod 208 (and pawl 201) may be changed to correspond to the distance between different types of connector clips.

Crimpable connectors or clips are fed across a stock guide 211, and under the lip 212 of a guide channel portion of a pressure pad 213. The clips are maintained under slight clamping pressure by a pair of bolts 214, 216 which are threaded into the bottom of the pressure pad 213 which trap springs 217, 218 (confined at one end thereof in counterbored portions of the bolts) that bear against the stock guide 211. The pressure pad 213, in one reduction to practice, was purchased as a "Pressure Pad, Part No. 43-1" from Essex International. In the same reduction to practice, stock guide 211 was purchased from Essex International and identified as that company's "Part No. 44-3". It will be understood by persons skilled in the art, of course, that the pressure pad and stock guide are shaped and contoured to accommodate the geometry of the particular connector 48 that is being handled in the apparatus 20.

Figure 11:
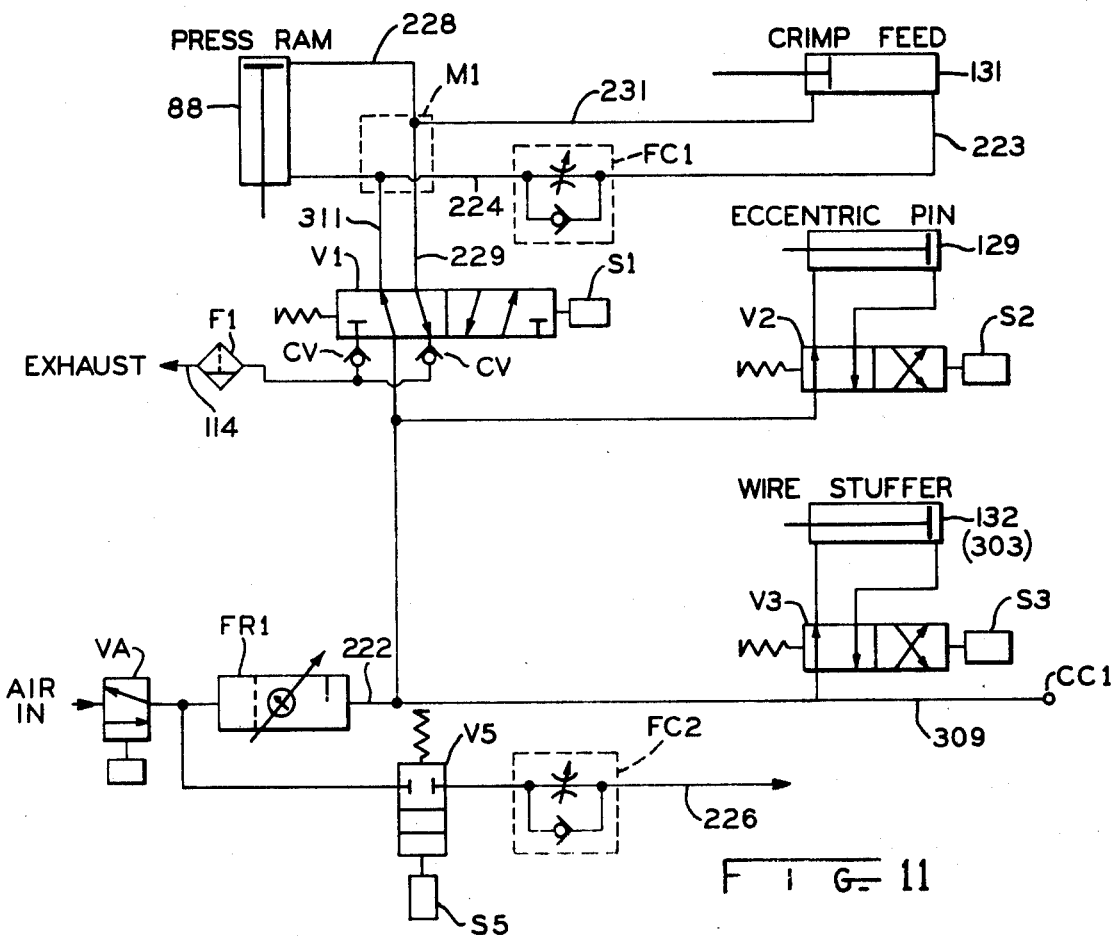
FIG. 11 is a schematic representation of a pneumatic system that can be utilized to control the apparatus of FIG. 1.
Figure 12:
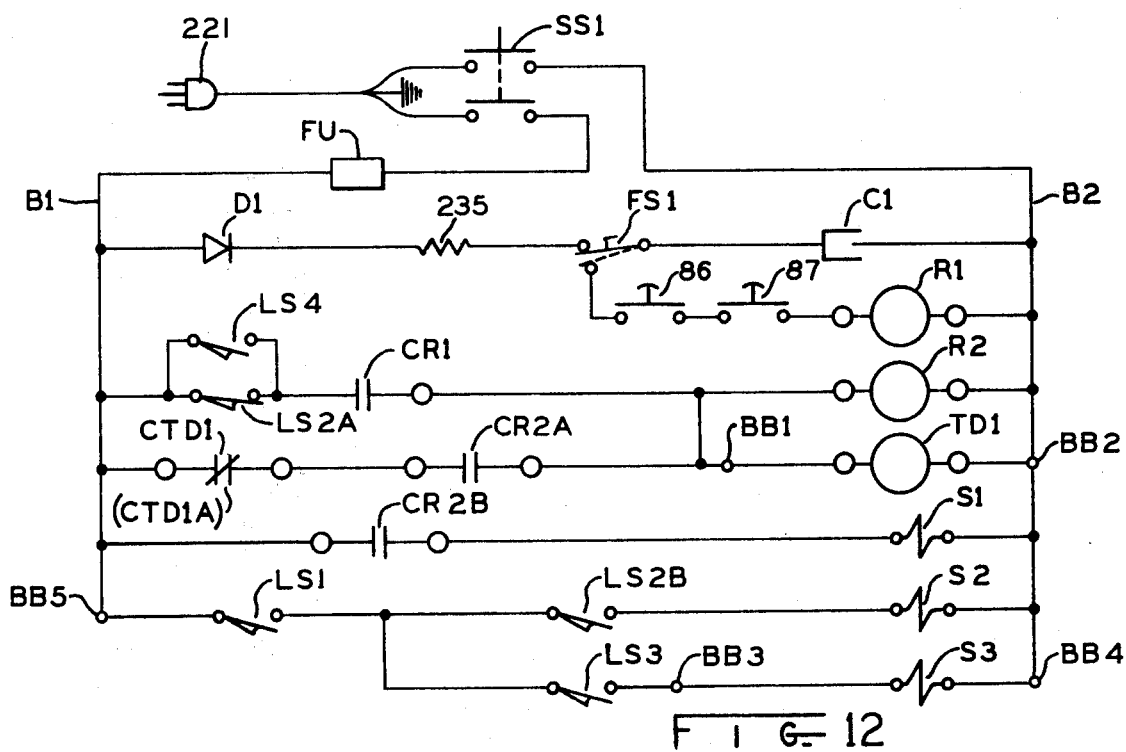
FIG. 12 is a schematic of an electrical control circuit that is utilized in conjunction with the pneumatic system of FIG. 11.

With reference now to FIGS. 11 and 12, the control and operation of the apparatus 20 will once again be explained. The same reference numerals have been used in FIGS. 11 and 12 for the same elements identified in other views, or parts intimately associated therewith. With particular reference now to FIG. 12, a power plug 221 must be plugged into a conventional 110 volt power source in order to prepare the apparatus 20 for operation. In addition, a safety switch SS1 is manually closed to interconnect the power source with bus lines B1 and B2.

The circuit of FIG. 12 is devised so that the apparatus 20 can be energized to form only one crimp at a time, and thus prevent malfunctions that might occur if the ram 88 were to be inadvertently energized in a manner that would effect a double stroke on a single given connector clip. This is accomplished by utilizing a solenoid operated valve V1 (see FIG. 11) for energizing the main press ram 88 and by utilizing a control circuit such that it is necessary for an operator to simultaneously close two hand switches and one foot switch before the rod of cylinder 88 cam be stroked. With the arrangement illustrated in FIG. 12, a capacitor is utilized to provide a one shot application of DC voltage to a DC relay in order to initiate a machine cycle. Then, before the machine can again be cycled, at least one hand or foot operated switch must be opened for a period of time to permit recharging of the capacitor.

With the foregoing in mind, reference now is made to FIG. 11 where I have schematically illustrated the four pneumatic cylinders 88, 131, 129, and 132. Commencing at the lower left-hand portion of FIG. 11, it will be noted that a supply of air (for example shop air at approximately 90 pounds per square inch, or 6.5 atmospheres of pressure) is admitted to a manually operated slide valve VA (which may be a PNEU-TROL slide valve No. 5L-25). While valve VA is "on," air is supplied to a filter regulator FR1 and from there to line 222. On the other hand, when valve VA is "off," line 222 (and thus the system of FIG. 11) is vented to atmosphere.

The filter-regulator FR1 may, for example, be a "REGO TRIO" Model 8883. As will be understood by persons skilled in the art, the filter regulator FR1 filters the air passing therethrough, and lubricates the air with oil. For this reason, filter-regulator FR1 includes an oil reservoir to which oil is periodically added, it being understood that such oil is added to the air supply in order to lubricate the valves and cylinders in the system of FIG. 11.

The regulator section of filter regulator FR1 is set to regulate the pressure of air passing therethrough to a range of 80 to 90 psi. Line 222 is also connected to three valves V1, V2, and V3. The valve V1 is a solenoid operated directional valve and may, for example, be a NUMATICS VALVE model 3JSA4. When solenoid S1 is not energized, a spring in valve V1 holds it in a position so that the high pressure supply air is applied to the rod end of cylinder 88, and the movable crimp tooling is held in a raised or inoperative position. Under this condition, high pressure air is also supplied (by means of lines 224, 223) to the blind end of crimp feed cylinder 131, and push pawl 201 (see FIG. 4) is held in its advanced position.

Air is supplied to line 223 from the valve V1 by means of a manifold block M1 which is machined to provide the desired air line connections. Air moving from manifold block M1 to line 223 also passes through a flow control valve FC1, which permits exhaust air to flow therethrough with substantially no restriction, but which presents a variable restriction to the flow of air from line 224 to line 223. The flow control valve FC1 may be, for example, a PNEU-TROL flow control valve EF10-B. At the instant that solenoid S1 is de-energized and the spool of valve V1 returns to the position indicated in FIG. 11, air is supplied to manifold block M1 and then to cylinder 88 to cause the main press ram to retract. At this same time, air is supplied to line 224. However, the flow control valve FC1 establishes, in effect, a mechanical time delay; and the actuation of cylinder 131 is thereby delayed for a sufficient period of time to permit retraction of the press ram 88 before the cylinder 131 is actuated and advances a new connector clip to the crimping station.

Cylinder 129, which controls the relative rotational position of eccentric pin 137 (see FIGS. 4 and 5) is controlled by valve V2 which is also a spring return solenoid operated directional valve. This valve may be, for example, a NUMATICS VALVE model 11SAD4-S50. When the solenoid S2 is energized, the rod of cylinder 129 is advanced, and when the solenoid S2 is de-energized, the rod of cylinder 129 is retracted as shown in FIG. 11. At this point, it should again be recalled that the actual amount of advance of the rod of cylinder 129 may be variably adjusted and controlled by mechanical or other means as previously discussed in connection with FIG. 4.

The wire stuffer 132 and the cylinder therefore (also identified by the reference numeral 132 in FIG. 11) is normally inoperative, and is only made operative to advance a link of stuffer wire when solenoid S3 is energized to shift the spool of valve V3 (which, for convenience, may be identical to the valve V2). Thus, if a segment of stuffer wire is needed for a particular interconnection, solenoid S3 will be actuated and air will be supplied from line 222 to the blind end of the cylinder 132. On the other hand, if stuffer wire is not needed for a particular connection, solenoid S3 will not be energized and shop air is supplied to the rod end of cylinder 132 and holds it in a retracted condition. The flow control valve FC2 (selected, for convenience, to be identical to the flow control valve FC1), and the line 226 that extends therefrom, is interconnected with a capillary port or tube 227 which is shown in FIG. 4.

Air leaving capillary tube 227 moves with a gentle flow that tends to direct air across the crimping station 61 and toward vacuum device 118. Thus, the flow of air from capillary tube 227 provides assistance in keeping the crimping station 61 free from debris.

With reference again to FIG. 11, the reason for providing filter F1 will be explained, it being assumed for a moment, that solenoid S1 has been actuated and that the rod of cylinder 88 has been fully advanced. Just after such rod has been fully advanced (and a crimp connection has been made); solenoid S1 is de-energized, and the spool of valve V1 returns to its initial position. Thereupon air pressure is applied to the rod end of cylinder 88, while the blind end of cylinder 88 is vented through line 228, manifold M1, and line 229 to the filter F1. Some of the air exhausted from cylinder 88 is applied to line 231 to effect retraction of the crimp feed cylinder 131 as previously mentioned. However, the balance of the air exhausted from cylinder 88 is supplied to filter F1 and thence to line 114 (which, it will be recalled, is used in the vacuum system of FIG. 3). Check valves CV (Deltrol No. EC20B) ensure that the exhaust air from both ends of cylinder 88 is applied to filter F1.

Since the air passing through line 114 surrounds scrap particles that are ultimately to be collected and disposed of, it is desirable that only dry air (i.e., substantially lubricant-free air) be admitted to the venturi 113 of FIG. 3. Filter F1 (which may be a REGO-FILTER No. 8823R) filters the air passing therethrough so that clean dry air is admitted to line 114.

With reference now to FIG. 12, the electrical control system for the apparatus 20 will be described. Upon closure of safety switch SS1, power is supplied to bus lines B1 and B2. With the arrangement shown, diode D1 effects halfwave rectification of the applied alternating voltage. When the operator controlled foot switch FS1 is in its normal position as illustrated in FIG. 12, the halfwave rectified voltage is supplied through resistor 235 and charges capacitor C1. The charging of capacitor takes a relatively short time (e.g., about a quarter of a second) and, once capacitor C1 has charged to approximately 110 volts, the system of FIG. 12 is ready for energization. It is noted at this point that relay R1 is a 110 volt DC relay, and that capacitor C1 must be dumped through the coil of relay R1 before it is actuated. The resistor 235 provides protection for the diode D1.

Prior to actuating foot switch FS1 (and the two thumb switches 86 and 87) the operator will have positioned a stator assembly in the stator holder 62 (of FIG. 1) and will have placed the leads extending therefrom in appropriate ones of the lead holders 63, 64 and 66. Moreover, the operator will have rotated the stator assembly (and holder 62) so that one of the lead holders will be positioned at the crimping station 61. Of course, when this occurs, the cams on the cam carrier or cylinder 73 will also be rotated and, depending upon what crimp heighth is desired, and whether a stuffer wire is needed, the limit switch arms 77 and 78 for the limit switches LS2 and LS3, respectively, will or will not be deflected.

At the time that the stator holder 62 is moved to the crimping station 61, a limit switch LS1 is closed by the back side of the arm 82 (see FIG. 1) which supports the stator holder 62. Then, after placing one or more magnet wire leads (and, if needed for the particular connection, a stranded lead wire) in or along a clip 48 at station 61, the operator will depress the foot pedal and move switch FS1 from the solid line position to the dotted line position thereof as shown in FIG. 12. Thereupon, the operator closes thumb switches 86 and 87, and thus interconnects the coil of relay R1 with the capacitor C1.

Thereupon capacitor C1 discharges and picks up relay R1. At that time, (still having reference to FIG. 12) normally open relay contacts CR1 close and supply line voltage to relay R2 (assuming that the contacts LS4 of limit switch LS4 or the contacts LS2A of limit switch LS2 are closed).

The contacts LS4 of limit switch LS4 will in fact be closed if the cylinder 129 (see FIG. 4) has fully advanced and closed limit switch LS4, all as will be explained hereinbelow. On the other hand, the contacts LS2A will be closed if no cam on drum 73 (see FIG. 1) has tripped limit switch arm 77. This safety interlock system is described in more detail hereinafter, but for purposes of the present discussion it is simply assumed that either contact LS4 or contact LS2A is closed so that relay R2 picks up when the contacts CR1 are closed.

When relay R2 picks up, normally open relay contacts CR2A and contacts CR2B close. At this instant, two events occur. First, the closure of contacts CR2A establishes a path for holding current to relay R2 through normally closed contacts CTD1 of time delay relay TD1. In addition, closure of the contacts CR2A energize time delay relay TD1.

When relay R2 is initially energized, normally open contacts CR2B close and energize the coil of solenoid S1. Energization of solenoid S1 causes a crimping action to occur (see FIG. 11) as air is supplied to the blind end of cylinder 88. Time delay relay TD1 is set to time out after one to one-and-one-half seconds, but this is a sufficient amount of time to ensure that ram 88 will establish a satisfactory crimped interconnection. When time delay relay TD1 times out, the normally closed contacts CTD1 open momentarily, interrupting current to relay R2, and relay R2 drops out. Thereupon, contacts CR2A and CR2B again open, with the result that solenoid S1 is de-energized and valve V1 (see FIG. 11) causes the retraction of the rod of cylinder 88 and (after a short time delay caused by flow control valve FC1), the advance of pawl 201 by cylinder 131.

With reference to FIG. 11, it will be recalled that the heighth of a crimped interconnection can be changed by actuating the cylinder 129 (under the influence of solenoid S2 and valve V2). Moreover, it will be recalled that a stuffer wire will be fed to the crimping station if solenoid S3 is energized, thereby to shift the spool of valve V3.

From FIG. 12, it will be noted that the solenoids S2 and S3 can only be energized if limit switch LS1 has been closed (thereby indicating that the stator holder 62 of FIG. 1 has been moved to a position proximate to the crimping station 61). Moreover, normally open limit switch contacts LS2B will be closed only if a cam on drum 73 has engaged limit switch arm 77. Similarly, solenoid S3 will be actuated only when the stator holder 62 is adjacent to the crimping station 61 (so that contacts LS1 of limit switch LS1 have been closed), and only if a cam carried by drum 73 has engaged switch arm 78 so as to close limit switch contacts LS3.

It was briefly mentioned hereinabove that a safety interlock system is provided which involves limit switch contacts LS4, and the limit switch contacts LS2A. This interlock system ensures that a crimp will be made (when a minimum height crimp is needed) only if the rod of cylinder 129 has been extended to a point such that limit switch LS4 has been closed.

For example, assuming that limit switch contacts LS1 have been closed, and further assuming that limit switch contacts LS2B have been closed calling for the actuation of cylinder 129 by solenoid S2; it will be noted that the normally closed contacts LS2A will be open. This disables the pick-up circuit for relay R2 in the event that cylinder 129 has not in fact advanced the rod thereof and closed limit switch LS4.

For purposes of exemplification only, but not for purposes of limitation, the various circuit elements illustrated in FIG. 12 will now be described in more detail. More specifically, the safety switch SS1 may be any suitable 110 volt switch, and fuse FU may have a five ampere rating. Diode DI has been a 600 volt, 11.5 ampere, GE diode type 1N1348. Resistor 235, for the application shown in FIG. 12, was selected to be an eight watt, one hundred ohm, OHMITE resistor. The foot switch FS1 and push button switches 86 and 87 were conventional commercially available hardware items; whereas the capacitor C1 was an eight microfarad, 400 volt component.

In the same reduction to practice, relay R1 was a Potter and Brumfield DC relay, type KRP11DG whereas the relay R2 was a Potter and Brumfield AC relay type KRP11AG; and time delay relay TD1 was an Eagle Timer No. CG2A6 (with a maximum time delay capability of 2 seconds). The limit switches LS1 through LS4 were all MICRO SWITCH limit switches.

From all of the foregoing, it is believed that a full and complete disclosure has now been made of preferred modes for practicing the invention, and for constructing apparatus that embodies the invention in preferred forms. Accordingly, the detailed disclosure made herein is for purposes of enablement, and not for purposes of limitation.

FIG. 4 illustrates stuffer or filler wire 191 being fed along the path followed by clips 48 along pressure pad 213. At least occasionally with this illustrated arrangement it is possible for the free or lead end of the stuffer wire to engage a side or leg of a clip 48 during advancement of the stuffer wire. Should this occur, a stuffer wire segment at the free end thereof may be bent and not be advanced into a clip 48 for crimping therewithin, even though it should be. Moreover, problems may arise with the arrangement shown in FIG. 4 related to the relative placement of a stuffer wire segment and magnet wire segments as discussed hereinabove.

Accordingly, in even more preferred arrangements, I bore a longitudinally extending hole along the clip feed pawl 201 to establish a desired stuffer wire path as generally represented at 219. An auxiliary guide, such as a small tube may also be mounted to the feed pawl in alignment with this path and the stuffer wire is then fed thereinto. Preferably, the path through the feed pawl is a hole sufficiently small so that the stuffer wire free end (if bent) will be straightened when it is retracted therealong. With the arrangement now being described, it is also preferable to mount the wire stuffer 132 on a support plate that is movable longitudinally relative to pressure pad 213 under the influence of an auxiliary prime mover such as a fluid cylinder or relay. With the preferred arrangement thus described, when filler wire is to be provided in a crimped connection, the wire stuffer 132 will be actuated to advance in the neighborhood of (for the particular Essex clip described hereinabove) one quarter of an inch of filler wire along the path 219. At the same time that the wire stuffer is actuated, the auxiliary prime mover will advance the entire wire stuffer mechanism 132 and thus the lead end of the filler wire toward the crimping station. Thereupon, the lead one quarter inch of filler wire will be severed and crimped into a clip 48 in overlying relationship to the magnet wire segments positioned adjacent the lower serrated surface of such clip.

After the connection has been made, the auxiliary prime mover will return the wire stuffer 132 to its rest or dwell position. This action retracts the lead end of the stuffer wire into the feed pawl with the result that straightness of the stuffer wire end is assured. In actual operation, all wires are in a proper desired predetermined position as each crimp is begun. Because of the crimping action and the shape of the crimped splice (as shown, e.g., in FIGS. 7-9), the filler wire ends up at one side of the connector splice. This in turn consistently results in the magnet wire being in direct contact with the clip serrations.

It should now be understood that a clear teaching has been presented regarding yet another preferred method. In this method, I advance a filler wire a predetermined distance as needed for a given splice connector and also advance the filler wire feed mechanism along with the filler wire a desired amount through a clip feed pawl. These two advancing actions may take place, of course, sequentially or substantially simultaneously. I then complete a crimped splice, connection, and retract the filler wire feed mechanism (and thus the free end of the filler wire) and straighten any major bends in the end of the filler wire.

With regard to the crimping process itself, I insure that a filler wire segment will overlie magnet wire segments in a connector clip prior to effecting a crimping action and thus ensure a good direct contact between clip serrations and magnet wire segments after a crimped splice has been made.

FIGS. 13-23 are herein presented to illustrate one specific means by which the just described even more preferred arrangements may be carried out. More specifically, FIG. 18 is a side elevation of a modified wire stuffer unit 301 and connector feed mechanism 302 that may be substituted for the unit 132 and mechanism 202. Different reference numerals are used to denote different parts in FIGS. 18-23, and to facilitate a better understanding of desirable modifications and operation of the system of FIG. 11 and the circuit of FIG. 12, parenthetical reference numerals are used in FIGS. 11 and 12 to represent those parts of mechanism 302 and unit 301 that would appear in FIGS. 11 and 12 in lieu of various parts of unit 132 and mechanism 202.

For example, when the mechanism of FIG. 18 is used, wire stuffer cylinder 303 becomes part of the system of FIG. 11 rather than cylinder 132, although the same solenoid valve may be used for both cylinders. Substitution, deletion, or addition of other parts of the mechanism 300 and unit 301 will become apparent as the description thereof now preceeds; one example of deletion and replacement being that crimp feed cylinder 131 and flow control valve FC1 would be completely omitted from the system of FIG. 11, and cylinder 304, along with flow control valves 306, 307, and valve 308 (of FIG. 14) would be utilized instead, and connected to line 309 of the system in FIG. 11 at connection point CC1, all as will be explained in more detail hereinbelow. When this is done, it will be understood that the outlets in manifold M1 (of FIG. 11) for lines 231 and 224 will be plugged, or that lines 311 and 229 will simply be connected directly to ram cylinder 88.

With reference now again to FIGS. 18 and 19, it will be seen that a feed pawl 313 is supported by feed pawl carrier 212, and that carrier 213 in turn is supported by cylinder 304 which is fastened thereto by means of nut 314 fastened to cylinder rod 316. The cylinder 304 is supported on pivot pin 204 which has been discussed hereinabove.

When cylinder 304 is actuated, it advances feed pawl 313 which will advance a connector clip to the crimping station 61 of the apparatus 20 (see FIG. 4).

The feed pawl 313 carries a stuffer wire guide tube 317, and thereby guides stuffer wire fed from guide means 192 and out of opening 318 when stuffer wire is needed for a connection.

The stuffer unit 301 is supported by mounting adapter arms 318 that are fastened to frame member 169 with bolts 319, 321. the adapter arms 318 rigidly support a side plate 323, and the cylinder 303 is fastened thereto by bolts 322.

Figure 21:
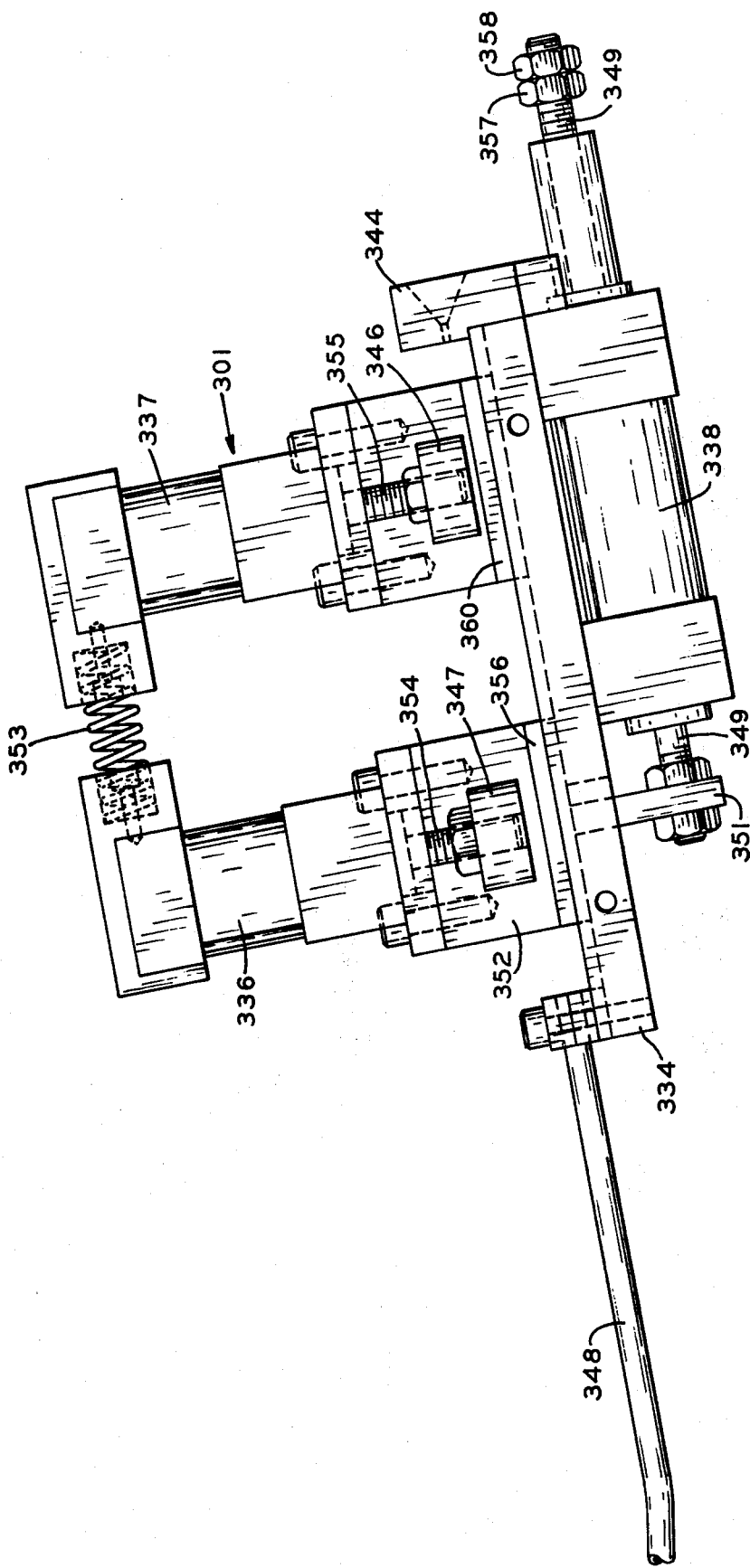

The side plate 323 (see FIG. 23), in addition to being fastened to arms 318 with bolts 328, has rigidly fastened thereto (by means of bolts 332) two parallel guide rails 329, 331; and these guide rails slidingly support a carriage of the unit 301 that is comprised of side plate 333, base 334, and cylinders 336, 337, and 338 (see FIGS. 23 and 21).

The entire carriage is movable longitudinally with slide plate 333 along the guide rails 329, 331 under the control of cylinder 303 because of the interconnection between rod 339 (see FIG. 20) and yoke 341 which is fastened by means of bolts 342 to slide plate 333. The yoke is freely movable along slot 343 which is most easily observed in FIGS. 18, 22, and 23.

With reference now again to FIG. 21, the cylinders 336, 337, and 338 constitute a hitch feed for stuffer wire that extends into guide 344, under piston rod pads 346, 347, and out of guide tubes 348. The cylinder 337 is rigidly fastened to base 334, and rod pad 346 moves toward and away from base 334 to either pinch and hold the stuffer wire or so as to permit it to pass thereunder. Cylinder 338, is also fixed to the base 334, and interconnected through its rod 349 and yoke 351 to carrier 352. Carrier 352 supports cylinder 336 and thus, as rod 349 advances or retracts, cylinder 336 and carrier 352 slide to and fro on base 334, with spring 353 tending to hold cylinder 336 in its forward most position. It will be understood that extension of rod 49 will cause a segment of stuffer wire advanced equal to the stroke or rod 49, provided of course that rod 354 is extended so that pad 347 is pinched against the upper surface of base 356 when cylinder 338 is energized. For many applications, a one-quarter inch feed of stuffer wire (and thus stroke of rod 349) is sufficient, but the actual feed stroke may be varied by adjusting stop nut 357 and jam nut 358 on the rod 349.

It should not be appreciated that stuffer wire may be advanced a first incremental distance of, for example, one quarter of an inch by the hitch feed mechanism just described. Moreover, the stuffer wire may also be fed and retracted a distance equal to the stroke of cylinder 303 when this cylinder is actuated to move the entire stuffer unit 301 relative to the adapters 318 and thus the frame of the crimping apparatus.

Before describing the operation of apparatus 20 with the mechanism of FIGS. 18–23 connected thereto, reference is now made to FIGS. 14, 15, 16, and 17; along with FIGS. 11 and 12.

Figure 15:
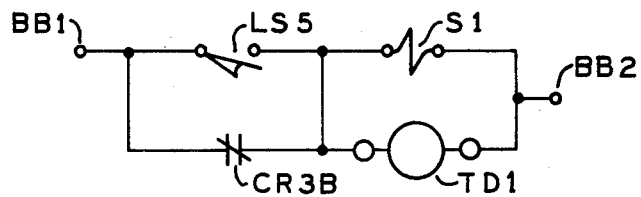
FIGS. 15, 16, and 17, are modified control circuits that may be substituted for parts of the circuit of FIG. 12 when a modified process is followed.
Figure 16:
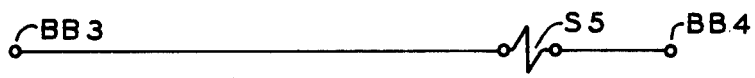
Figure 17:
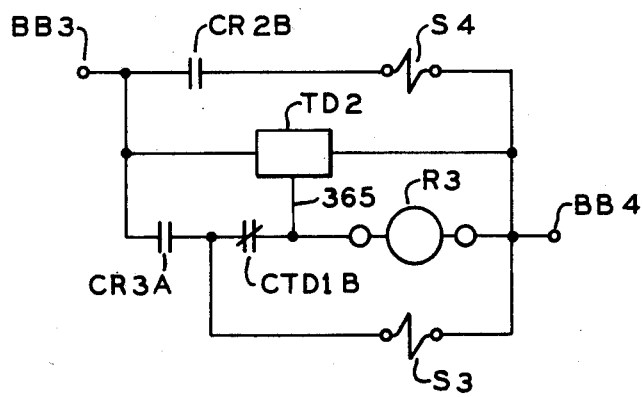
Figure 20:
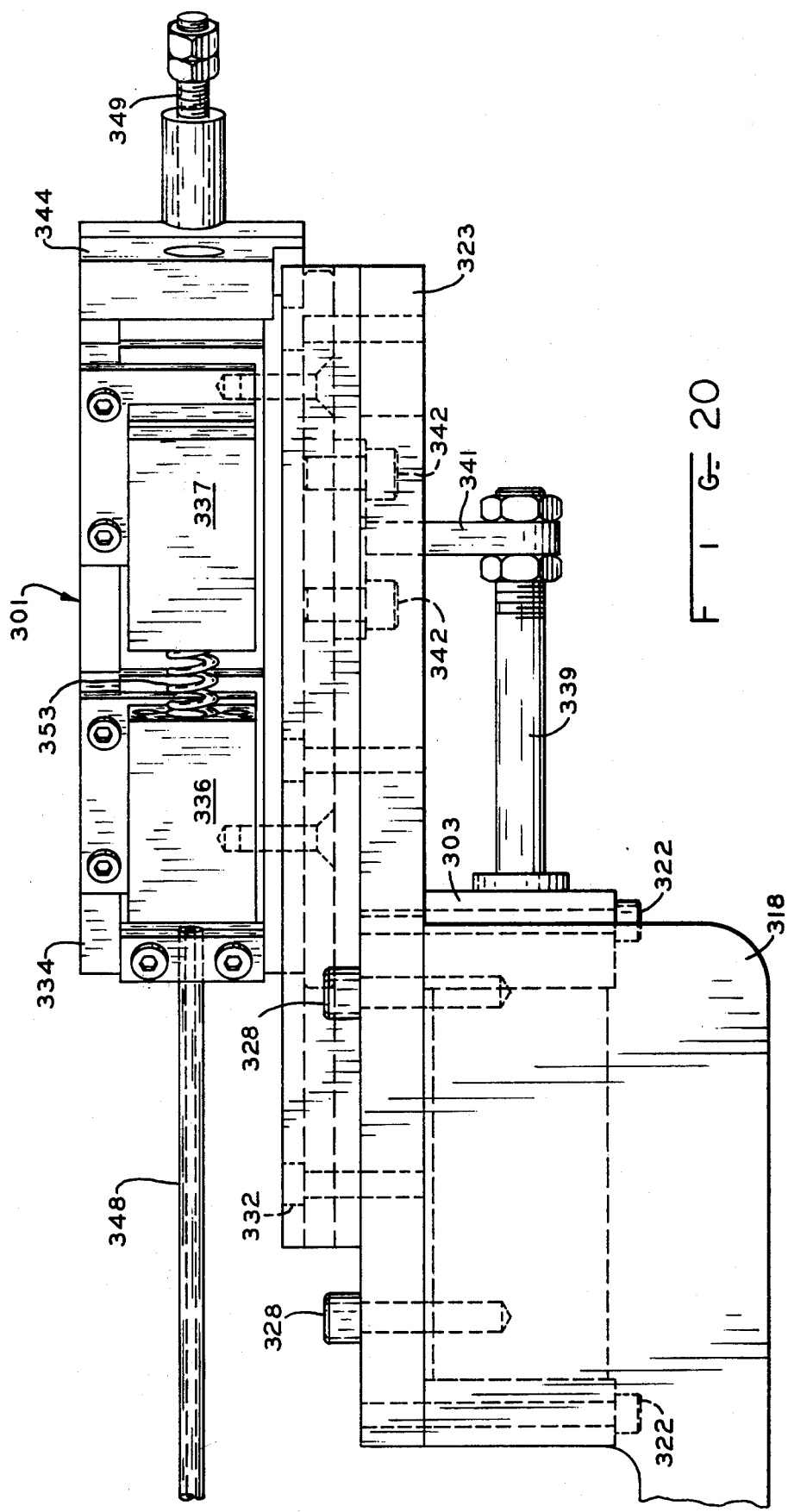

With initial reference to FIG. 12, it is noted that this circuit is mofified (when unit 301 and mechanism 302) is used, by: 1) removing CR2B and S1 from the circuit as originally shown and described; 2) modifying the original circuit between points BB1 and BB2 shown in FIG. 15; 3) by adding the coil of a solenoid S5 between points BB5 and BB6 as shown in FIG. 16; and 4) modifying the original circuitry between points BB3 and BB4 as shown in FIG. 17.

When this re-arrangement and modification of the original circuit is completed, the apparatus 20 will operate generally as before except that a hitch feed of stuffer wire will be provided, and the leading portion of stuffer wire will be advanced and retracted by the action of cylinder 303.

FIG. 14 shows how the cylinders and solenoid valves, and other hardware revealed in FIGS. 18–23 would be interconnected with the original control system of FIG. 11. Thus, the cylinders 304, 336, 337, and 338 would all be connected through conduit or hose 362 to the connection point CC1 and thus line 309. Moreover, the cylinder 131 would be removed as previously mentioned.

One sequence of operation of the modified apparatus will now be discussed. Prior to initiating operation of the machine, it is assumed that the condition of the various cylinders shown in FIG. 14 and FIG. 11 (modified as previously mentioned) is as follows: cylinders 88, 338, 336, and 303 retracted; cylinders 304, and 337 extended; and cylinder 129 either extended or retracted.

As the operator moves the stator carrier into the crimp station, it is assumed that limit switch contacts LS1 and LS3 are closed, which means that the connection will require a length of stuffer wire. The closure of limit switches LS1 and LS3 causes cylinder 303 to retract and this retraction of cylinder 303 causes approximately a 2-inch advancement of stuffer wire toward the crimping station.

The operator now presses buttons 86 and 87 by hand, and foot switch FS1. At this time, and concurrently with each other, cylinder 336 advances to pinch the stuffer wire, cylinder 337 retracts to release the stuffer wire, and cylinder 338 is advanced. Advancement of cylinder 338 causes an additional one-quarter of an inch of filler wire to be advanced toward the crimping station.

The fixed cylinder 337, by its retraction, frees the stuffer wire so that it may be advanced from the supply. On the other hand, cylinder 336 as it extends, pinches or grips the stuffer wire so that the stuffer wire is forced in an advancing mode at the time that cylinder 336 is advanced toward the crimping station because of the extending action of cylinder 338.

These cylinders 338, 336, and 337, along with valve V4 and solenoid S4 constitute a hitch feed. As will be seen from FIG. 17, solenoid S4 is energized by actuation or relay R2 (see FIG. 12), and the closing of contacts CR2B. As cylinder 338 is fully extended, the lead end of the rod of cylinder 338 contacts and closes a limit switch LS5 (see FIG. 15). The act of closing this limit swich then energizes solenoid S1 and thereby causes the main press ram to extend and form a crimped connection. Just after the press ram has been actuated, and the squeeze time timer TD1 (see FIG. 15) has started timing, but just before the press ram retracts, cylinder 303 extends and thereby causes a retraction of two inches of stuffer wire back into the pathway through the feed pawl 318.

As the main press ram raises back to its rest position, the feed cylinder 304 retracts and thereby causes the feed pawl to retract to its "at rest" or "ready to feed" position. Just prior to the time that cylinder 338 retracts, cylinder 336 will retract to release its grip on the stuffer wire, and cylinder 337 will extend.

With reference to FIG. 4 and valve 308 (which was a Numatic OCLA4-5 cam valve) when the press ram is in its fully raised position, the switch of this valve is acuated so that air flows through flow control valve 306 and causes the feed cylinder 304 to advance. However, when the press ram starts down and releases the cam roller of valve 308, air flow is through valve 307 which causes retraction of the feed cylinder 304. This prevents any possibility of the main press ram closing on the feed pawl and damaging the mechanism. This arrangement clearly differs from my first embodiment which utilizes exhaust air from the main press ram cylinder to actuate the feed cylinder 131.

By way of further description, when the limit switches LS1 and LS3 were closed in the above discussion (and cylinder 303 retracted to advance stuffer wire because electronic timer TD2 instantaneously energized relay R3 and caused its contacts CR3A to close and actuate solenoid S3 of valve V3); normally closed contacts CR3B of relay R3 were opened (see FIGS. 17 and 15), and it was not possible for cylinder 88 to instantly advance because its solenoid S1 would see an open circuit through the opened contacts CR3B and still open limit switch LS5.

However, after wire stuffer cylinder 303 has retracted, and hitch feed cylinder 338 has advanced, limit switch LS5 is closed. Closing of switch LS5 then energizes soldnoid S1 to cause the main cylinder ram to advance, and time delay relay TD1 is energized. The main cylinder ram 88 remains advanced and squeezes the connection so long as time delay relay TD1 is timing out. Then, when relay TD1 times out, it opens its normally closed contacts CTD1 and causes retraction of the main cylinder 88.

I have found that the stuffer wire, always being on top of the connection (and usually of soft aluminum) may smear and stick to the movable crimp tooling at times. When this occus, retraction of cylinder 88 and the movable tooling will tend to pull the stuffer wire with it, and if the stuffer is pulled too far, an objectionable bend may be made in it. This may be avoided, however, with the use of suitable time delay means that ensure advancement of cylinder 303 (and thus retraction of the stuffer wire away from the crimping station) before the main cylinder 88 is fully retracted, although cylinder 303 should not be advanced before cylinder 88 actually starts to retract.

In the control circuit of FIGS. 12, 15, and 17, the actual timing sequence is such that ram cylinder 88 starts retracting before cylinder 303 starts to advance. Moreover, cylinder 303 will be advanced before cylinder 88 reaches its "home" position. This result is obtained because of the timing actions of relay TD1, timer TD2, and the mechanical delay in opening of contacts CR3A when relay R3 drops out.

More specifically, timer TD2 will time out at its selected time (e.g., 1.5 seconds) so that no voltage be supplied through TD2 to line 365 (see FIG. 17). Thus, relay R3 is held "in" only because of a circuit through its own contacts CR3A and the still closed contacts CTD1. Then, when relay TD1 times out, contacts CTD1A and CTD1B open simultaneously with the result that cylinder 88 will start to retract, and relay R3 will drop out. However, there is a delay of about 40 milli-seconds after retraction of cylinder 88 is inititated and relay R3 drops out before contacts CR3A actually open. During this cascaded delay period, solenoid S3 is still energized through contacts CR3A, and thus, cylinder 303 is not advanced until just after cylinder 88 has started to retract. This cascaded delay period, however, is short enough that cylinder 303 advances while the rod of cylinder 88 is still being retracted.

The type and identity of the components shown in FIGS. 14-17 will all be apparent to persons skilled in the art and therefore, need not be further described, with the possible exception of timer TD2 which was a TS2411.5 SSAC pruchased from Precision Products, Inc. (P.O. Box 395, Liverpool, N.Y.).

The solenoid S5 of FIG. 16 is provided to control valve V5 and ensure that no air will be supplied to flow control valve FC2 (see FIG. 11) when the main power switch SS1 is turned off.

It should now be apparent to persons skilled in the art that numerous modifications may be made while still practicing and retaining the benefits of various inventive aspects that have been taught by applicant. For example, indicia that represent the relative orientation of stator assembly vis-a-vis a crimping station have been illustrated in the form of mechanical and electromechanical elements. However, it should be obvious that optical means could also be provided. For example, proximity sensing or photo-electric devices could be utilized in lieu of mechanical switches.

It also will be understood that magnetic indicia could be provided on each stator assembly, and that such indicia would then be used to control the actuation of solenoids in FIG. 12 whenever such magnetic indicia were proximate to a reference position of the apparatus 20.

Accordingly, while there has been shown and described herein preferred embodiments of the present invention in accordance with the Patent Statutes, changes may be made therein without actually departing from the true spirit and scope of the invention. Accordingly, I intend to cover in the following claims all such equivalent variations as fall within the invention.

What I claim as new and desire to secure by Letters Patent of the United States is:

1. Apparatus for making an electrical interconnection with at least one magnet wire segment extending from a winding supported on the core of a dynamoelectric machine, wherein the interconnection comprises a crimped splice connector folded upon the at least one magnet wire segment at least one filler wire segment, and at least one other wire segment and wherein the at least one magnet wire segment, the at least one other wire segment, and an uncrimped splice connector are positioned at a crimping station; the apparatus including means for advancing uncrimped splice connectors to the crimping station; means for advancing a filler wire segment comprising a first portion and a remainder toward and into the crimping station a total predetermined distance along a confined pathway and for positioning the lead end of the filler wire segment in overlying relationship relative to the at least one magnet wire segment; means for crimping the splice connector about the first portion of the filler wire segment, the at least one magnet wire segment, and the at least one other wire segment, and for severing the first portion of the filler wire segment from the remainder of the filler wire segment thereby to establish a new filler wire segment end; and control means for causing retraction of the remainder of the filler wire segment along the confined pathway a distance less than the predetermined distance and thereby ensuring that the remainder of the filler wire segment is devoid of major bends therealong.

2. The apparatus of claim 1 wherein the means for advancing uncrimped splice connectors includes a feed pawl having a filler wire segment accommodating passage therealong.

3. A crimping machine for making crimped connections having at least one magnet wire segment and at least one filler wire segment confined within a crimped connector; said machine comprising means for feeding segments of filler wire to a crimping station, the improvement wherein the means for feeding comprises a hitch feed mechanism supported for movement relative to the crimping station and wherein the machine includes power means for advancing and retracting the hitch feed mechanism relative to the crimping station.

4. The machine of claim 3 wherein the means for crimping includes a main drive cylinder rod movable to an advanced position and to a retracted rest position, and the control means causes the hitch feed mechanism to be retracted before the main drive cylinder rod is fully moved to its retracted rest position.

5. A crimpable clip feeding mechanism and hitch feed mechanism for a crimping machine comprising a feed pawl for engaging and moving splice connector clips; and a hitch feed mechanism for advancing stuffer wire, said clip feeding mechanism including means for guiding filler wire segments and means for straightening filler wire segments; and said hitch feed mechanism including means for guiding stuffer wire to the clip feeding mechanism.

6. A method of making an electrical interconnection with at least one magnet wire segment extending from a winding supported on the core of a dynamoelectric machine, wherein the interconnection comprises a crimped splice connector folded upon the at least one magnet wire segment, at least one filler wire segment, and at least one other wire segment, wherein the method includes positioning the at least one magnet wire segment, the at least one other wire segment, and an uncrimped splice connector at a crimping station; the method also comprising: advancing a filler wire segment comprising a first portion and a remainder toward and into the crimping station a total predetermined distance along a confined pathway and positioning the lead end of the filler wire segment in overlying relationship relative to the at least one magnet wire segment; crimping the splice connector about the first portion of the filler wire segment, the at least one magnet wire segment, and the at least one other wire segment, and severing the first portion of the filler wire segment from the remainder of the filler wire segment thereby to establish a new filler wire segment end; and retracting the remainder of the filler wire segment along the confined pathway a distance less than the predetermined distance and thereby ensuring that the remainder of the filler wire segment is devoid of major bends therealong.

7. The method of claim 6 wherein the positioning of the uncrimped connector comprises advancing the uncrimped splice connector to the crimping station by a feed pawl having a filler wire segment accommodating passage therealong, and the steps of advancing and retracting the filler wire segment each comprise moving the filler wire segment relative to the feed pawl and along the wire accommodating passage.

8. A crimping machine for making crimped connections having at least one magnet wire segment and at least one filler wire segment confined within a crimped connector; said machine comprising means for feeding segments of filler wire to a crimping station, the improvement wherein the means for feeding is supported for movement relative to the crimping station and wherein the machine includes power means for advancing and retracting the means for feeding relative to the crimping station.

9. The machine of claim 8 wherein the machine further comprises means for straightening filler wire segments while the means for feeding is being retracted relative to the crimping station.

10. A crimpable clip feeding mechanism for a crimping machine comprising a feel pawl for engaging and moving splice connector clips; said mechanism including means for guiding filler wire segments and means for straightening filler wire segments.

* * * * *

UNITED STATES PATENT AND TRADEMARK OFFICE
CERTIFICATE OF CORRECTION

PATENT NO. : 4,051,594

DATED : October 4, 1977

INVENTOR(S) : Alan L. Kindig

It is certified that error appears in the above-identified patent and that said Letters Patent are hereby corrected as shown below:

```
Col. 5, line 60, "loads" should be --leads--
Col. 9, line 23, "disloding" should be --dislodging--.
Col. 11, line 49, delete "0.058" and insert --0.508--.
Col. 19, line 12, delete "the" and insert --The--;
         line 19, delete "side" and insert --slide--;
         line 51, delete "not" and insert --now--.
```

Signed and Sealed this

Fifth Day of December 1978

[SEAL]

Attest:

RUTH C. MASON
*Attesting Officer*

DONALD W. BANNER
*Commissioner of Patents and Trademarks*